US009890003B2

United States Patent
Nakayama et al.

(10) Patent No.: US 9,890,003 B2
(45) Date of Patent: Feb. 13, 2018

(54) SHEET DISCRIMINATOR AND IMAGE FORMING APPARATUS INCORPORATING THE SHEET DISCRIMINATOR

(71) Applicants: Satoshi Nakayama, Kanagawa (JP); Noriaki Takenaga, Tokyo (JP); Hideyo Makino, Tokyo (JP); Tetsuya Ofuchi, Kanagawa (JP); Takayuki Nishimura, Kanagawa (JP); Yasuyuki Sekino, Kanagawa (JP); Tohru Matsumoto, Kanagawa (JP); Yukifumi Kobayashi, Kanagawa (JP)

(72) Inventors: Satoshi Nakayama, Kanagawa (JP); Noriaki Takenaga, Tokyo (JP); Hideyo Makino, Tokyo (JP); Tetsuya Ofuchi, Kanagawa (JP); Takayuki Nishimura, Kanagawa (JP); Yasuyuki Sekino, Kanagawa (JP); Tohru Matsumoto, Kanagawa (JP); Yukifumi Kobayashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 49 days.

(21) Appl. No.: 14/868,915

(22) Filed: Sep. 29, 2015

(65) Prior Publication Data
US 2016/0090256 A1 Mar. 31, 2016

(30) Foreign Application Priority Data

Sep. 30, 2014 (JP) ................................. 2014-201460
Mar. 2, 2015 (JP) ................................. 2015-040008

(51) Int. Cl.
*B65H 7/14* (2006.01)
*B65H 7/06* (2006.01)
(Continued)

(52) U.S. Cl.
CPC ................. *B65H 7/14* (2013.01); *B65H 7/06* (2013.01); *G01B 11/06* (2013.01);
(Continued)

(58) Field of Classification Search
CPC ............ B65H 2511/13; B65H 2511/16; B65H 2511/17; B65H 7/14; B65H 7/06;
(Continued)

(56) References Cited

U.S. PATENT DOCUMENTS

2002/0196716 A1* 12/2002 Morisaki .............. G11B 15/689
369/30.35
2007/0019024 A1* 1/2007 Sanpei ................. G03G 15/201
347/16

(Continued)

FOREIGN PATENT DOCUMENTS

JP 2007-233186 9/2007

*Primary Examiner* — David Banh
(74) *Attorney, Agent, or Firm* — Harness, Dickey & Pierce, P.L.C.

(57) ABSTRACT

A sheet discriminator, which can be included in an image forming apparatus, includes a sheet loader on which a recording medium is loaded, an information detector including a light emitter to emit light to a surface of the recording medium loaded on the sheet loader and a light receiver to receive the light emitted by the light emitter and detecting information of the recording medium, a sheet distinguisher to distinguish a type of the recording medium based on the information detected by the information detector, and a detector body encasing at least the information detector therein and having an opening formed on an opposing face facing the sheet loader. The opposing face has an opening formed thereon. The opening has at least one arc-shaped side.

16 Claims, 19 Drawing Sheets

(51) Int. Cl.
*G03G 15/00* (2006.01)
*G01B 11/06* (2006.01)

(52) U.S. Cl.
CPC ..... *G03G 15/5029* (2013.01); *G03G 15/6502* (2013.01); *B65H 2511/13* (2013.01); *B65H 2511/414* (2013.01); *B65H 2511/416* (2013.01); *B65H 2515/60* (2013.01); *B65H 2553/412* (2013.01); *B65H 2553/414* (2013.01); *B65H 2553/46* (2013.01); *G03G 2215/00725* (2013.01)

(58) Field of Classification Search
CPC ........ B65H 2511/416; B65H 2511/414; B65H 2515/60; B65H 2553/412; B65H 2553/414; B65H 2553/46; G03G 15/5029; G03G 15/5025; G03G 15/6502; G03G 2215/00725; H03N 1/007244; G01B 11/06
See application file for complete search history.

(56) References Cited

U.S. PATENT DOCUMENTS

| | | | |
|---|---|---|---|
| 2008/0193157 A1* | 8/2008 | Shelton | G03G 15/65 399/82 |
| 2008/0240750 A1* | 10/2008 | Hanamoto | G03G 21/1623 399/45 |
| 2010/0019445 A1* | 1/2010 | Yoneyama | B65H 7/02 271/265.01 |
| 2010/0039473 A1* | 2/2010 | Terada | B41J 11/0095 347/19 |
| 2010/0301551 A1* | 12/2010 | Muranaka | B65H 7/12 271/265.04 |
| 2011/0052085 A1* | 3/2011 | Ikari | G07D 7/12 382/224 |
| 2012/0002227 A1* | 1/2012 | Ogino | B41J 11/009 358/1.12 |
| 2012/0038943 A1* | 2/2012 | Hakamada | H04N 1/00708 358/1.13 |
| 2012/0134693 A1* | 5/2012 | Hoshi | G03G 15/5029 399/45 |
| 2012/0137533 A1* | 6/2012 | Muranaka | B65H 7/02 33/833 |
| 2013/0057861 A1* | 3/2013 | Ishii | G01N 21/4738 356/369 |
| 2013/0057868 A1* | 3/2013 | Oba | G01N 21/4738 356/445 |
| 2013/0194573 A1* | 8/2013 | Ohba | G03G 15/5029 356/369 |
| 2013/0216245 A1* | 8/2013 | Hoshi | G03G 15/0189 399/45 |
| 2013/0216246 A1* | 8/2013 | Hoshi | G03G 15/6591 399/45 |
| 2013/0216247 A1* | 8/2013 | Oba | G03G 15/5029 399/45 |
| 2013/0228674 A1* | 9/2013 | Oba | G01J 1/0429 250/225 |
| 2013/0235377 A1* | 9/2013 | Ishii | G01N 21/21 356/369 |
| 2014/0192361 A1* | 7/2014 | Endo | G01N 21/31 356/446 |
| 2015/0151938 A1* | 6/2015 | Matsumoto | B65H 7/14 358/1.12 |
| 2015/0186762 A1 | 7/2015 | Nishimura et al. | |

\* cited by examiner

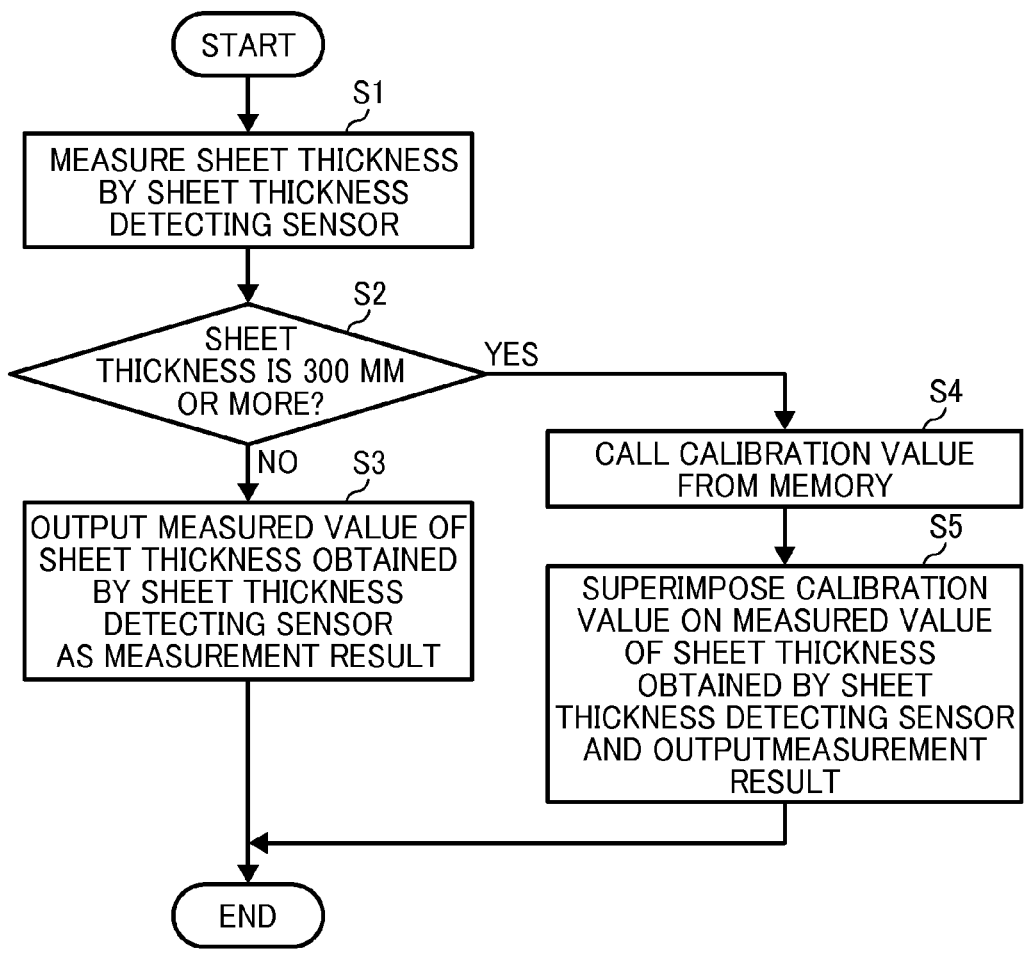

SHEET DISCRIMINATOR AND IMAGE FORMING APPARATUS INCORPORATING THE SHEET DISCRIMINATOR

CROSS-REFERENCE TO RELATED APPLICATIONS

This patent application is based on and claims priority pursuant to 35 U.S.C. § 119(a) to Japanese Patent Application Nos. 2014-201460, filed on Sep. 30, 2014, and 2015-040008, filed on Mar. 2, 2015, in the Japan Patent Office, the entire disclosure of each of which is hereby incorporated by reference herein.

BACKGROUND

Technical Field

This disclosure relates to a sheet discriminator and an image forming apparatus incorporating the sheet discriminator.

Related Art

An example of an image forming apparatus shows a configuration in which a sheet discriminator is disposed inside the image forming apparatus to discriminate information of a sheet being conveyed in a sheet conveying path.

This sheet discriminator includes an optical sensor that has a light emitting element and a light receiving element therein. The optical sensor includes a sheet information detecting sensor to optically detect information of a sheet. The light emitting element of the sheet information detecting sensor emits light to a surface of a sheet. Among the light emitted by the light emitting element, the light reflected on the surface of the sheet is received by a reflection light receiving element.

Specifically, the sheet information detector causes the light emitting element to emit light to a sheet that is conveyed via a sheet conveying path and causes the reflection light receiving element to receive the light reflected on the sheet and the transmission light receiving element to receive the light transmitted through the sheet, so that the sheet information detector can detect feature information of the sheet to specify the sheet type based on optical information including a level of the received light.

Accordingly, based on the thus detected feature information of the sheet, a controller that functions as a sheet distinguisher distinguishes the sheet types, and the image forming apparatus sets the image forming conditions according to the sheet type.

The sheet discriminator is disposed not only inside an image forming apparatus but also outside the image forming apparatus.

The sheet discriminator has an external case having sidewalls. On one sidewall of the external case, an opening is provided through which the sheet can be pulled out. Further, the sheet discriminator includes an optical sensor and a sheet loading part. The optical sensor to detect information of the sheet. The sheet loading part on which the sheet inserted through the opening is loaded is disposed facing the optical sensor with a certain gap inside the external case.

SUMMARY

At least one aspect of this disclosure provides a sheet discriminator including a sheet loader on which a recording medium is loaded, an information detector including a light emitter to emit light to a surface of the recording medium loaded on the sheet loader and a light receiver to receive the light emitted by the light emitter and detecting information of the recording medium, a sheet distinguisher to distinguish a type of the recording medium based on the information detected by the information detector, and a detector body encasing at least the information detector therein and having an opening formed on an opposing face facing the sheet loader. The opening has at least one arc-shaped side.

Further, at least one aspect of this disclosure provides an image forming apparatus including an apparatus body, the above-described sheet discriminator according to claim 1 disposed outside the apparatus body, and an image forming part to form an image on the recording medium.

BRIEF DESCRIPTION OF THE SEVERAL VIEWS OF THE DRAWINGS

FIG. 24 is a flowchart showing a calibrating operation of the actual measurement of a sheet thickness measured by a sheet thickness detecting sensor of the sheet discriminator.

DETAILED DESCRIPTION

Figure 1:
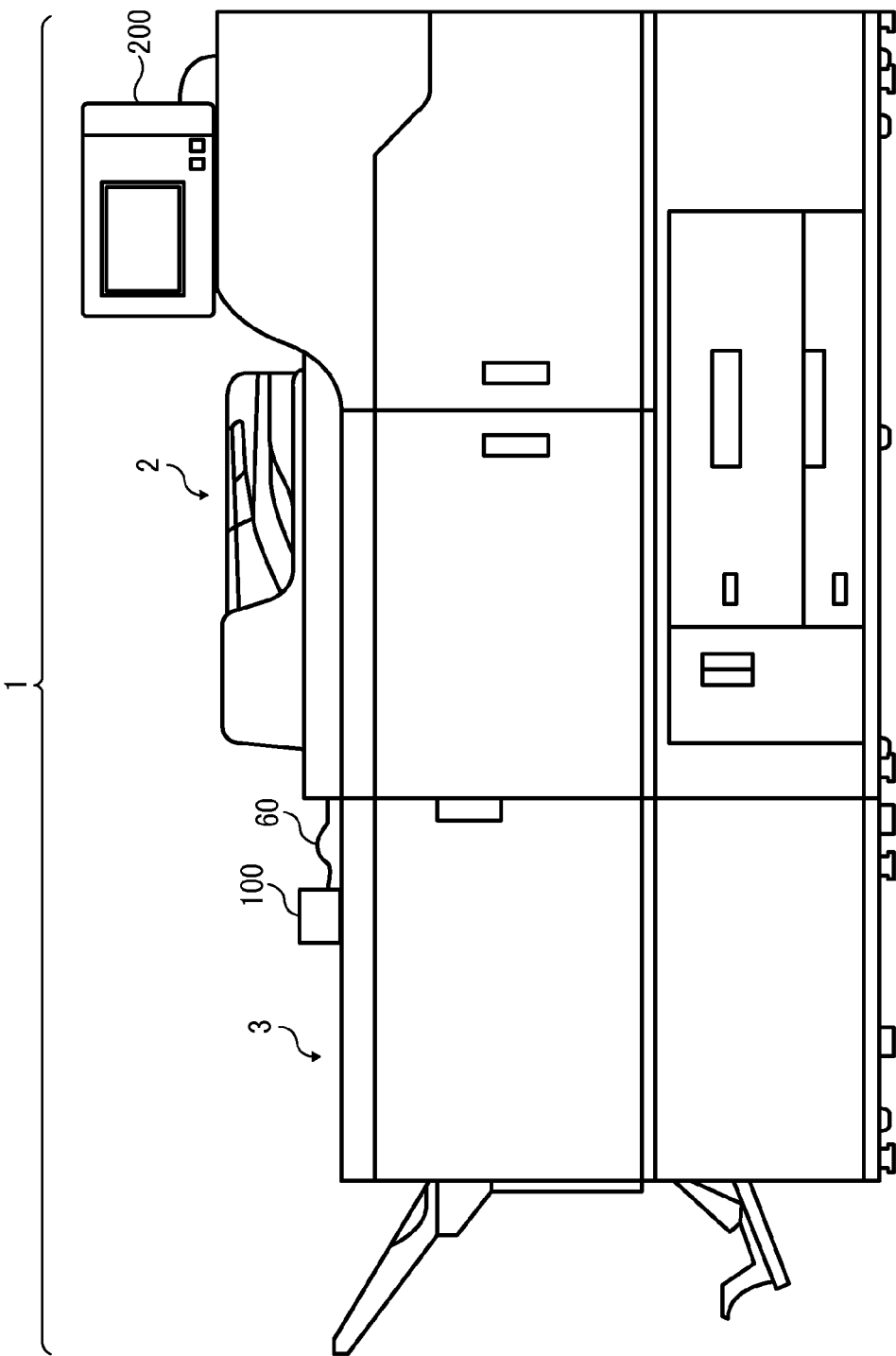
FIG. 1 is a diagram illustrating a schematic configuration of an image forming system according to an example of this disclosure.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus, and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

Now, a description is given of a configuration of an image forming system 1 according to an example of this disclosure, with reference to FIG. 1.

As illustrated in FIG. 1, the image forming system 1 includes an image forming apparatus 2, a sheet finishing apparatus 3 that functions as a sheet finisher, and a sheet discriminator 100. The sheet discriminator 100 is disposed in the image forming system 1 outside the image forming apparatus 2. Details of the sheet discriminator 100 is described below.

The image forming apparatus 2 and the sheet finishing apparatus 3 are connected to communicate with each other. In the image forming system 1, after the image forming apparatus 2 has formed an image on the sheet P, the sheet finishing apparatus 3 accepts the sheet P from the image forming apparatus 2 for various post-processing operations to the sheet P.

The post-processing operations include, for example, a side stitching process, a center folding process, and the like.

The center folding process includes a saddle stitching process. The sheet finishing apparatus 3 that executes the above-described various post-processing operations includes a sheet discharge mode, a side stitching mode, and a saddle stitching mode.

Figure 2:
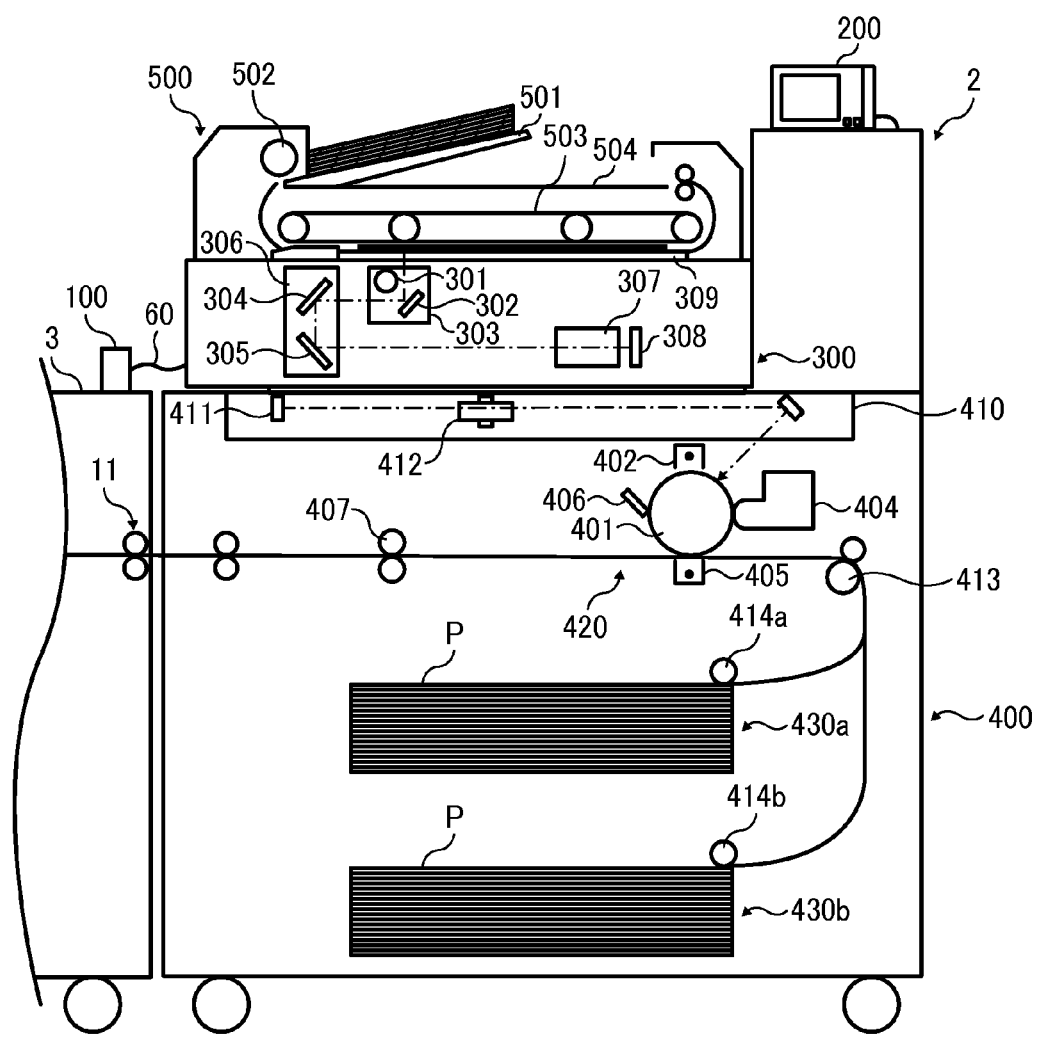
FIG. 2 is a diagram illustrating a configuration of an image forming apparatus included in the image forming system of FIG. 1.

FIG. 2 is a diagram illustrating a configuration of the image forming apparatus 2 included in the image forming system 1 of FIG. 1.

The image forming apparatus 2 may be a copier, a printer, a scanner, a facsimile machine, a plotter, and a multifunction peripheral or a multifunction printer (MFP) having at least one of copying, printing, scanning, facsimile, and plotter functions, or the like. According to the present example, the image forming apparatus 2 is an electrophotographic printer that forms toner images on a sheet or sheets by electrophotography.

More specifically, the image forming apparatus 2 functions as a printer. However, the image forming apparatus 2 can expand its function as a copier by adding a scanner as an option disposed on top of an apparatus body of the image forming apparatus 2. The image forming apparatus 2 can further obtain functions as a facsimile machine by adding an optional facsimile substrate in the apparatus body of the image forming apparatus 2.

Further, this disclosure is also applicable to image forming apparatuses adapted to form images through other schemes, such as known ink jet schemes, known toner projection schemes, or the like as well as to image forming apparatuses adapted to form images through electro-photographic schemes.

Further, it is to be noted in the following examples that: the term "image forming apparatus" indicates an apparatus in which an image is formed on a recording medium such as paper, OHP (overhead projector) transparencies, OHP film sheets, thread, fiber, fabric, leather, metal, plastic, glass, wood, and/or ceramic by attracting developer or ink thereto; the term "image formation" indicates an action for providing (i.e., printing) not only an image having meanings such as texts and figures on a recording medium but also an image having no meaning such as patterns on a recording medium; and the term "sheet" is not limited to indicate a paper material but also includes the above-described plastic material (e.g., a OHP sheet), a fabric sheet and so forth, and is used to which the developer or ink is attracted. In addition, the "sheet" is not limited to a flexible sheet but is applicable to a rigid plate-shaped sheet and a relatively thick sheet.

The image forming apparatus 2 includes an apparatus body 400, an image reading device 300, and an automatic document feeder (ADF) 500.

The apparatus body 400 encases an image forming part 420 and sheet trays 430a and 430b therein. The sheet trays 430a and 430b are vertically disposed below the image forming part 420. The sheet trays 430a and 430b have sheet feed rollers 414a and 414b, respectively, and accommodate the sheet P that functions as a recording medium. After the sheet P being fed by a selected one of the sheet feed rollers 414a and 414b, the sheet P accommodated in each of the sheet trays 430a and 430b is conveyed upwardly along a corresponding sheet conveying path before reaching a registration roller pair 413.

The image forming part 420 includes a photoconductor drum 401 that functions as an image bearer, a charger 402, an exposing device 410, a developing device 404, a transfer device 405, and a cleaning device 406.

The charger 402 uniformly charges a surface of the photoconductor drum 401.

The exposing device 410 is a latent image forming device to form an electrostatic latent image on the surface of the photoconductor drum 401 based on image data read by the image reading device 300.

The developing device 404 supplies toner to adhere to the electrostatic latent image formed on the surface of the photoconductor drum 401 and develops the electrostatic latent image with toner into a visible toner image.

The transfer device 405 is an image transfer body to transfer the visible toner image on the photoconductor drum 401 onto the sheet P.

The cleaning device 406 is a cleaner to remove residual toner remaining on the surface of the photoconductor drum 401 after transfer of the toner image onto the sheet P.

The image forming apparatus 2 further includes a fixing device 407 that is disposed at a downstream side of the image forming part 420 in a sheet conveying direction. The fixing device 407 functions as a fuser to fix the toner image to the sheet P.

The exposing device 410 include a laser unit 411 and a polygon mirror 412. The laser unit 411 emits laser light based on the image data under control of a controller provided to the apparatus body 400.

The polygon mirror 412 scans the laser light emitted by the laser unit 411 in a direction of rotation axis of the photoconductor drum 401 (i.e., in a main scanning direction).

The image reading device 300 functions as an image reader to read image data of an original document.

The ADF 500 is disposed above the image reading device 300 and is connected to the image reading device 300. The ADF 500 includes a document table 501, a document feed roller 502, a transfer belt 503, and a document ejecting tray 504.

When original documents are set on the document table 501, upon receipt of a signal to start reading image data of the original documents, the document feed roller 502 of the ADF 500 feeds the original documents placed on the document table 501 one by one. Each original document fed by the document feed roller 502 is guided by the transfer belt 503 to a contact glass 309 and is halted on the contact glass 309 temporarily.

With the original document halted on the contact glass 309, the image reading device 300 reads the image data of the original document. Thereafter, the transfer belt 503 resumes to convey the original document to the document ejecting tray 504.

Next, a description is given of a series of image reading processes and a series of image forming processes.

Either when the ADF 500 feeds the original document to the contact glass 309 or when a user places the original document on the contact glass 309 manually and inputs a copy start instruction via a control panel 200, a light source 301 mounted on a first moving unit 303 emits light. Along with the light emission, the first moving unit 303 and a second moving unit 306 are moved along a guide rail.

As the light source 301 emits the light onto the original document placed on the contact glass 309, the reflection light reflects on the original document. The reflection light is guided to a mirror 302 mounted on the first moving unit 303 and mirrors 304 and 305 mounted on the second moving unit 306 to a lens 307 so as to be received by a CCD 308. As a result, the CCD 308 reads the image data of the original document and the read image data is converted from analog data to digital data by an analog/digital (A/D) conversion circuit provided to the image forming apparatus 2. The image data is then transmitted from a data output port of the image reading device 300 to the controller of the apparatus body 400.

By contrast, the apparatus body 400 starts driving the photoconductor drum 401. As the photoconductor drum 401 rotates at a given speed, the charger 402 uniformly charges the surface of the photoconductor drum 401. The exposing device 410 then exposes light to the surface of the photoconductor drum 401 to form the electrostatic latent image based on the image data read by the image reading device 300.

Then, the developing device 404 develops the electrostatic latent image formed on the surface of the photoconductor drum 401 into a visible toner image. The sheet P is fed from a selected one of the sheet trays 430a and 430b by a corresponding one of the sheet feed rollers 414a and 414b and temporarily stopped at the registration roller pair 413.

In synchronization with timing at which the leading end of the toner image formed on the surface of the photoconductor drum 401 reaches an image transfer part that is located facing the transfer device 405, the registration roller pair 413 conveys the sheet P to the image transfer part. When the sheet P passes the image transfer part, the toner image formed on the surface of the photoconductor drum 401 is transferred onto the sheet P due to an action of an electric field in a transfer nip region.

Thereafter, the sheet P having the toner image on the surface thereof is conveyed to the fixing device 407 so that the fixing device 407 fixes the toner image to the sheet P. Then, the sheet P is discharged to the sheet finishing apparatus 3.

It is to be noted that residual toner remaining on the surface of the photoconductor drum 401 without being transferred onto the sheet P at the image transfer part is removed from the photoconductor drum 401 by the cleaning device 406.

Figure 3:
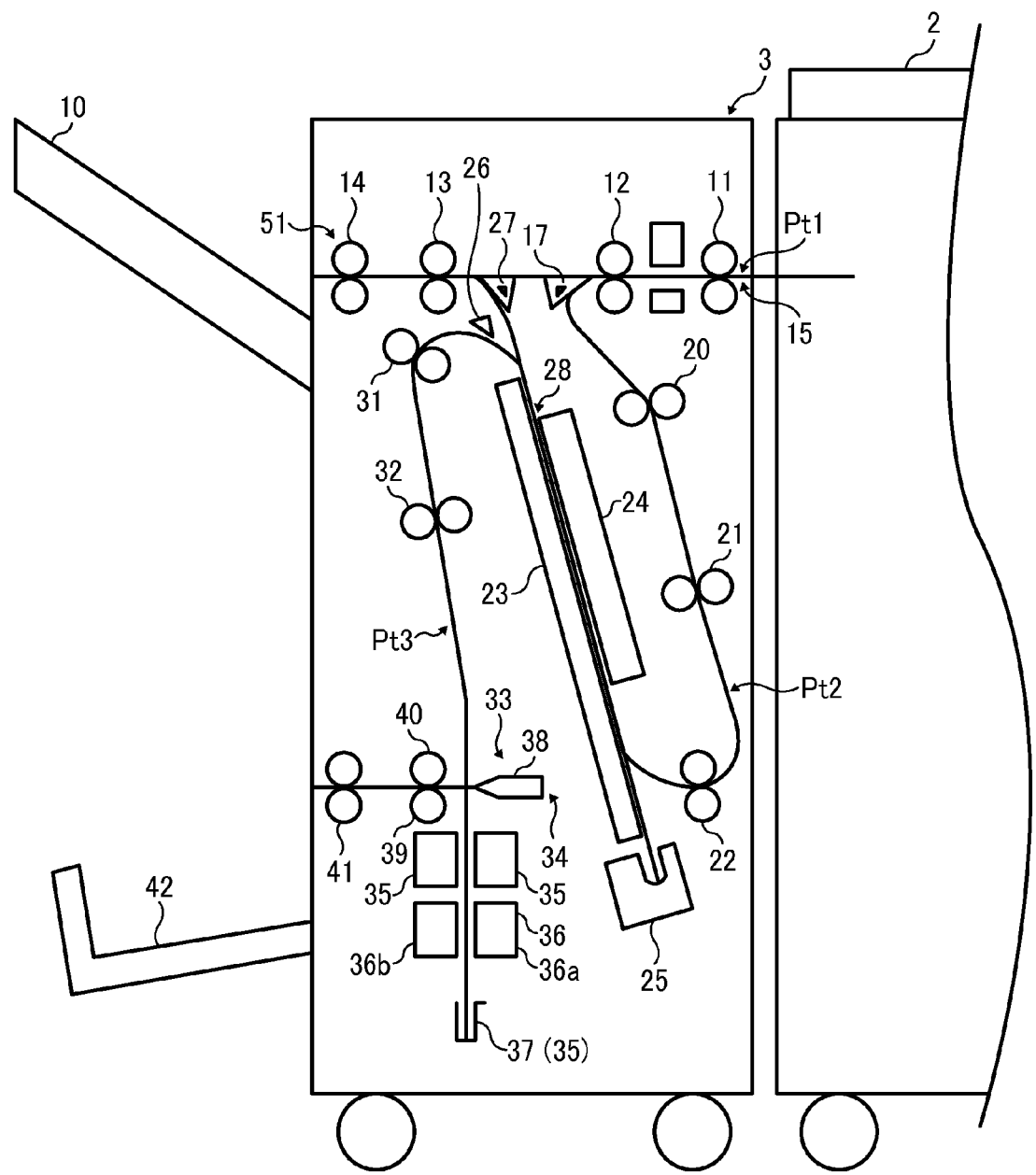
FIG. 3 is a diagram illustrating a configuration of a sheet finishing apparatus included in the image forming system of FIG. 1.

A description is given of the sheet finishing apparatus 3 with reference to FIG. 3.

FIG. 3 is a diagram illustrating a configuration of the sheet finishing apparatus 3 included in the image forming system 1 illustrated in FIG. 1.

The sheet finishing apparatus 3 includes a first conveying path Pt1, a second conveying path Pt2, and a third conveying path Pt3. The first conveying path Pt1 is a path through which the sheet P ejected from the image forming apparatus 2 travels to a first sheet ejecting tray 10. The second conveying path Pt2 branches from the first conveying path Pt1 to perform a side stitching operation to a bundle of sheets. The third conveying path Pt3 is connected to the second conveying path Pt2 to perform a saddle-stitched and center-folding operation to the bundle of sheets.

The first conveying path Pt1, the second conveying path Pt2, and the third conveying path Pt3 are defined by guide members, for example.

The first conveying path Pt1 includes an entrance roller 11, a sheet conveying roller 12, a sheet conveying roller 13, and a sheet ejecting roller 14, which are disposed in this order along the first conveying path Pt1 from an upstream side to a downstream side in the sheet conveying direction.

The entrance roller 11, the sheet conveying roller 12, the sheet conveying roller 13, and the sheet ejecting roller 14 are driven by a motor that functions as a driving source to convey the sheet P.

The first conveying path Pt1 further includes an entrance sensor 15 disposed upstream from the entrance roller 11 in the sheet conveying direction. The entrance sensor 15 detects that the sheet P is conveyed into the sheet finishing apparatus 3.

A switching claw 17 is disposed downstream from the sheet conveying roller 12 in the sheet conveying direction. The switching claw 17 pivots to switch the position to selectively guide the sheet P to one of a downstream side of the switching claw 17 in the first conveying path Pt1 in the sheet conveying direction and the second conveying path Pt2. The switching claw 17 is driven by a motor or a solenoid.

In a sheet ejecting mode, the sheet P conveyed from the image forming apparatus 2 to the first conveying path Pt1 is conveyed by the entrance roller 11, the sheet conveying roller 12, the sheet conveying roller 13, and the sheet ejecting roller 14 and is discharged to the first sheet ejecting tray 10.

By contrast, in a side stitching mode and a center folding mode, the sheet P entered into the first conveying path Pt1 is conveyed by the entrance roller 11 and the sheet conveying roller 12. After the course of direction thereof has been changed by the switching claw 17, the sheet P is conveyed to the second conveying path Pt2.

The second conveying path Pt2 includes a sheet conveying roller 20, a sheet conveying roller 21, a sheet conveying roller 22, a sheet tray 23, a first sheet aligning part 24, and a side stitching unit (a first stitching unit) 25.

The sheet conveying roller 20, the sheet conveying roller 21, and the conveying roller 22 are driven by a motor. The first sheet aligning part 24 is driven by the motor.

Switching claws 26 and 27 are disposed at a downstream side of the sheet tray 23 in the sheet conveying direction. The switching claws 26 and 27 pivot to switch respective positions, so that the sheet P is selectively guided to one of the downstream side of the switching claw 17 in the first conveying path Pt in the first conveying path Pt1 and the third conveying path Pt3. The switching claws 26 and 27 are driven by a motor or a solenoid, for example.

In the side stitching mode, multiple sheets P are sequentially loaded on the selected one of the sheet trays 23. By so doing, the bundle of sheets including the multiple sheets P loaded thereon is formed. At this time, the trailing end of the bundle of sheets contacts a first movable reference fence that is disposed on the sheet tray 23 to align a position of the bundle of sheets in the sheet conveying direction and a width position of the bundle of sheets by the first sheet aligning part 24.

The sheet tray 23, the first sheet aligning part 24, and the first movable reference fence form a first bundling part 28 that functions as a bundling part to make multiple sheets into a stacked sheet bundle. The first bundling part 28 further includes a motor to drive the first sheet aligning part 24 and a motor to drive the first movable reference fence.

The side-stitched sheet bundle is conveyed by the first movable reference fence to the first conveying path Pt1. Then, the side-stitched sheet bundle is further conveyed by the sheet conveying roller 13 and the sheet ejecting roller 14 to be discharged to the first sheet ejecting tray 10.

Here, the sheet ejecting roller 14 functions as a sheet ejecting member to discharge the sheet bundle that is bundled by the side stitching unit 25. By contrast, in the center folding mode, the sheet P conveyed to the second conveying path Pt2 is conveyed to the third conveying path Pt3 by the sheet conveying rollers 20, 21, and 22, and the first movable reference fence.

The third conveying path Pt3 includes a sheet conveying roller 31, a sheet conveying roller 32, and a binding and folding part 33.

A motor drives the sheet conveying rollers 31 and 32 to convey the sheet P. The binding and folding part 33 includes a center folding part 34, a saddle stitching part (a second stitching unit) 35, and a second bundling part 36.

The sheet P conveyed to the third conveying path Pt3 is conveyed by the sheet conveying rollers 31 and 32 one by one to the second bundling part 36. As a result, a sheet bundle of layered multiple sheets P is made. Specifically, the second bundling part 36 makes a stacked sheet bundle with multiple sheets conveyed by a sheet conveying part 51 that includes the entrance roller 11 and the sheet conveying rollers 12, 20, 21, 22, 31, and 32.

At this time, the leading end of the sheet bundle including the sheets P contacts a second movable reference fence 37 to be aligned in the sheet conveying direction and contacts a second sheet aligning part to be aligned in a sheet width direction.

The saddle stitching part 35 stitches the sheet bundle at or in the vicinity of the center of the sheet bundle in the sheet conveying direction. The saddle-stitched sheet bundle is returned to a center folding position by the second movable reference fence 37. The second movable reference fence 37 is driven by a motor.

The center folding part 34 folds the sheet bundle at the center thereof in the sheet conveying direction. In the center folding part 34, a folding blade 38 is disposed to face the center of the sheet bundle at the center folding position in the sheet conveying direction. The folding blade 38 that is driven by a motor moves from right to left of FIG. 2 to fold the center of the sheet bundle in the sheet conveying direction to insert the sheet bundle between a lower pressure roller 39 and an upper pressure roller 40.

The folded sheet bundle is pressed by the lower pressure roller 39 and the upper pressure roller 40. The lower pressure roller 39 and the upper pressure roller 40 are driven by a motor.

The above-described center-folded sheet bundle is discharged by the lower pressure roller 39, the upper pressure roller 40, and a sheet ejecting roller 41 to a second sheet ejecting tray 42.

As illustrated in FIG. 1, the sheet discriminator 100 according to this example is connected with the image forming apparatus 2 by a communication cable 60 that functions as a communicator. According to this configuration, the sheet discriminator 100 and the image forming apparatus 2 can communicate with each other.

Figure 4:
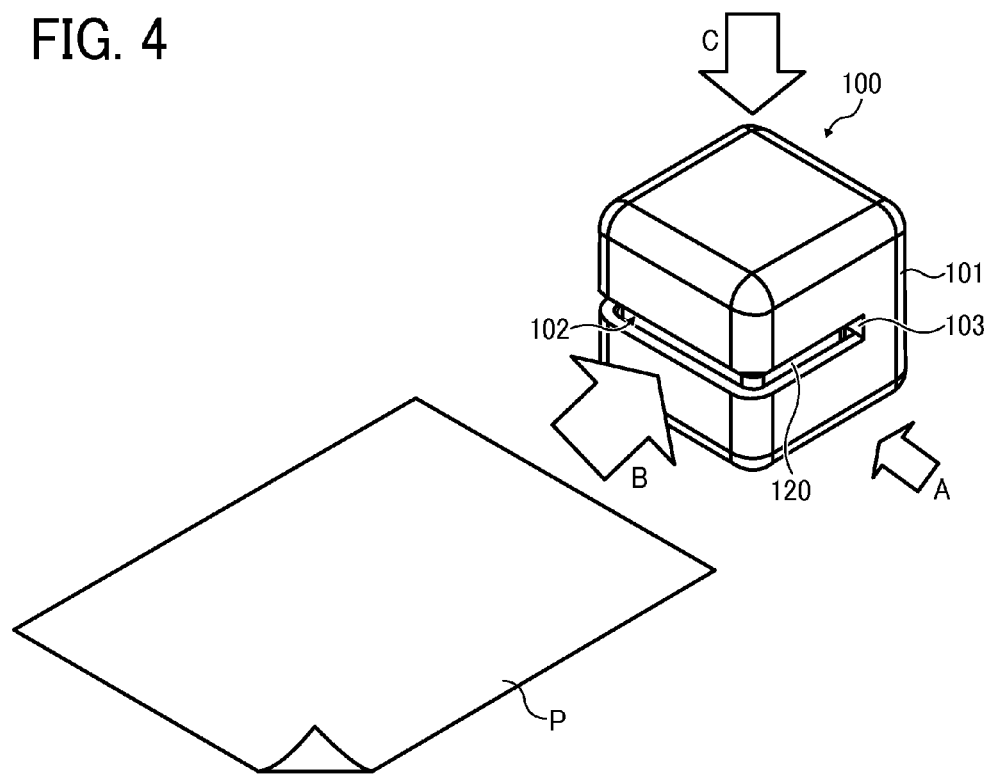
FIG. 4 is a diagram illustrating a sheet discriminator according to an example of this disclosure.

Now, a description is given of a sheet discriminator 100 according to this disclosure with reference to FIG. 4.

FIG. 4 is a diagram illustrating a configuration of the sheet discriminator 100.

As illustrated in FIG. 4, the sheet discriminator 100 includes an external case 101. The external case 101 includes a sheet information detecting unit 110 and a sheet loading table 120 therein.

The external case 101 has sidewalls. A sheet inserting part 102 is formed on one of the sidewalls of the external case 101. The sheet P is inserted into and removed from the sheet inserting part 102 so that the sheet P is loaded on the sheet loading table 120.

The sheet P is inserted into the sheet inserting part 102 of the sheet discriminator 100 in a direction indicated by arrow B in FIG. 4 and pushed further until the sheet P contacts an end face 103 of the sheet inserting part 102 or approaches the end face 103.

At this time, it is preferable that the operator grabs both left and right ends of the sheet P with respect to the direction B and inserts the sheet while checking that the sheet P has no deformation such as wrinkle or crease on the sheet P. It is to be noted that sheet insertion to the sheet inserting part 102 is not limited to the above-described way but is applicable with any way of sheet insertion even if the sheet P can be inserted into the sheet inserting part 102 of the sheet discriminator 100 horizontally.

Now, a description is given of a configuration and functions of the sheet discriminator 100 according to an example of this disclosure.

Figure 5:
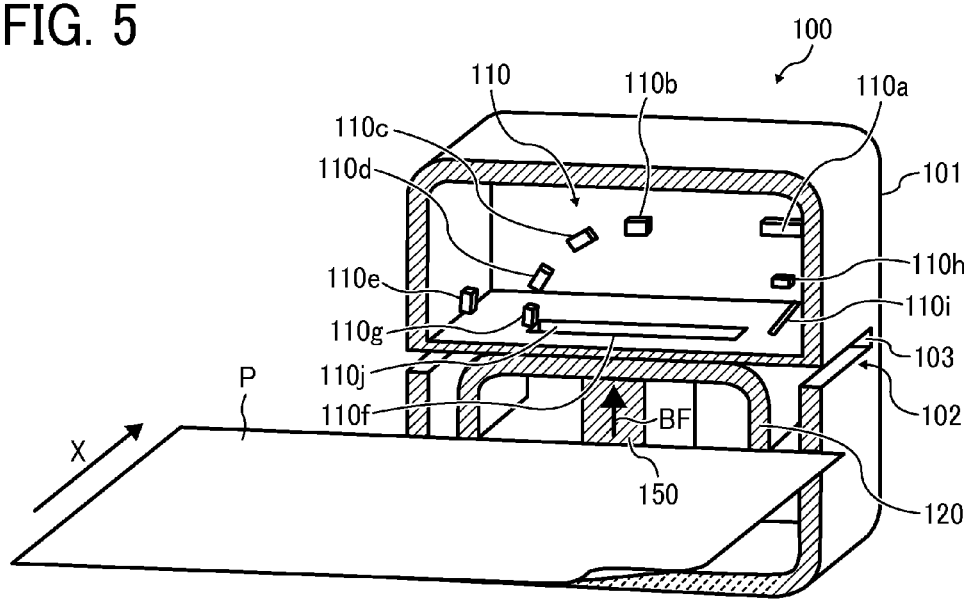
FIG. 5 is a perspective view illustrating a cross sectional view of the sheet discriminator of FIG. 4, as viewed in a direction indicated by arrow B in FIG. 4.
Figure 6:
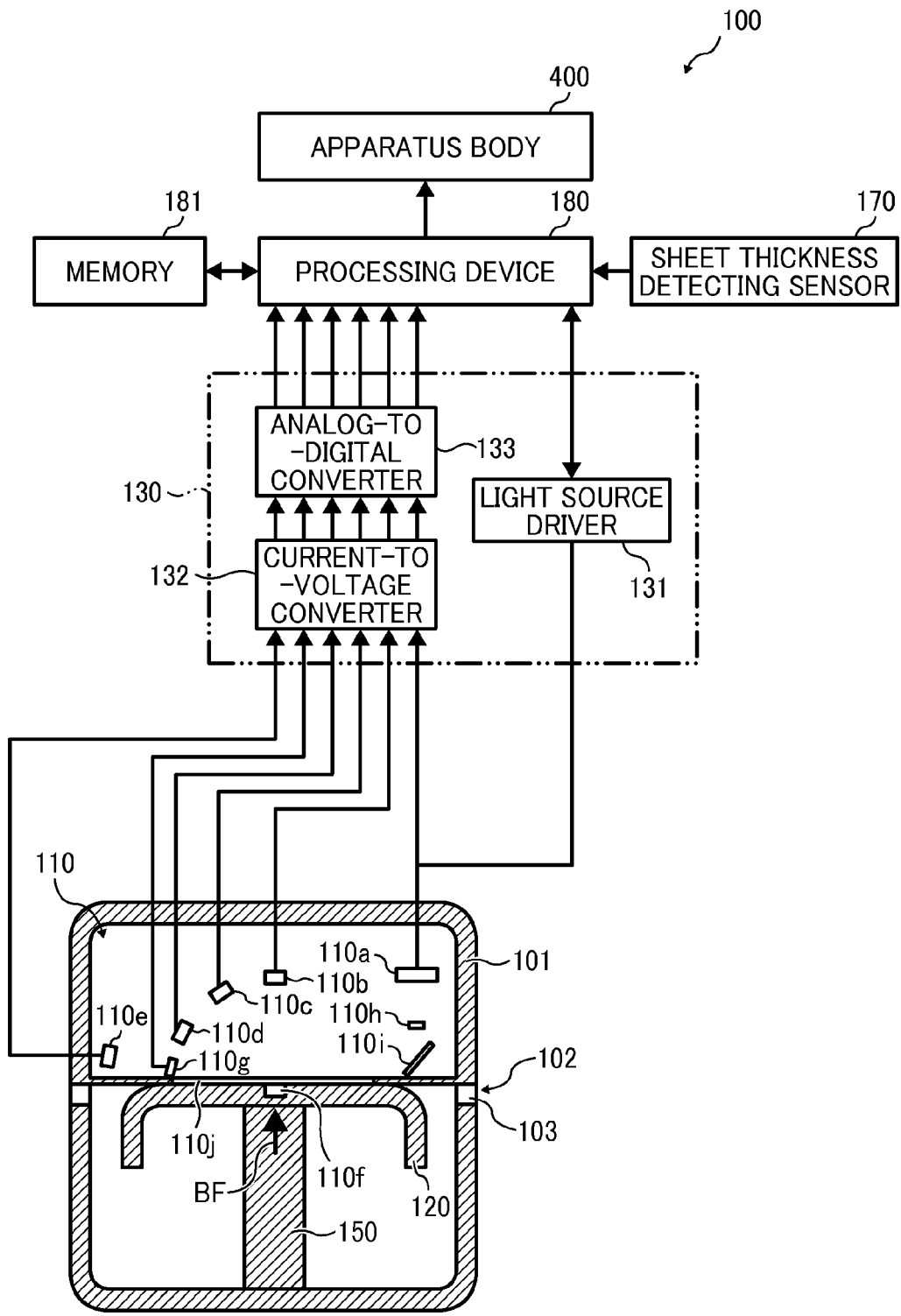
FIG. 6 is a cross sectional view of the sheet discriminator of FIG. 4 in the vicinity of the opening, as viewed in the direction indicated by arrow B in FIG. 4.

FIG. 5 is a perspective view illustrating a cross sectional view of the sheet discriminator 100 of FIG. 4, as viewed in the direction B in FIG. 4. FIG. 6 is a cross sectional view of the sheet discriminator 100 of FIG. 4 in the vicinity of an opening 110j, as viewed in the direction B in FIG. 4.

The sheet discriminator 100 includes an external case 101. The external case 101 includes the sheet information detecting unit 110, a sheet loading table 120, a light emission processing unit 130, a sheet thickness detecting sensor 170, a processing device 180, and a memory 181 therein.

The sheet information detecting unit 110 is disposed at an upper part of an inside of the external case 101.

The sheet loading table 120 is disposed at a lower part of the inside of the external case 101. The sheet loading table 120 is disposed facing the sheet information detecting unit 110 across a gap therebetween.

The processing device 180, the memory 181, and the sheet thickness detecting sensor 170 are used for controlling calibration of a measured value of sheet thickness. The processing device 180 that functions as a sheet distinguisher determines a calibration value. The memory 181 stores the calibration value.

Details of the processing device 180, the memory 181, and the sheet thickness detecting sensor 170 are described below.

Further, a biasing member 150 such as a spring is disposed facing the sheet information detecting unit 110 with the sheet loading table 120 interposed therebetween. The sheet loading table 120 is biased by the biasing member 150 in a direction indicated by an arrow BF in FIG. 5, that is, toward the sheet information detecting unit 110.

In FIG. 5, the sheet P is inserted toward the end face 103 of the sheet inserting part 102 of the sheet discriminator 100 in the direction B. When the sheet P reaches a position near the end face 103, the sheet information detecting unit 110 detects the sheet P.

The sheet information detecting unit 110 includes a light source 110a, light receiving elements 110b, 110c, 110d, 110e, and 110f, lens 110g and 110h, a mirror 110i, and an opening 110j.

The light source 110a functions as a light emitter including multiple light emitting elements, which are vertical cavity surface emitting laser (VCSEL). The light source 110a is controlled by a controller that functions as a light emission controller to start and stop of light emission thereof.

In the sheet discriminator 100 according to the present example, a starting operation of sheet discrimination is performed using the control panel 200 that functions as an instruction device. By so doing, instructions to perform light emission by the light source 110a can be issued from the control panel 200 to the controller. Consequently, the light source 110a starts light emission when the sheet information detecting unit 110 detects sheet information of the sheet P. As a result, when compared with a case in which the light source 110a constantly emits light, the sheet discriminator 100 according to the present example can extend the life span of the light source 110a and reduce waste energy consumption thereof.

The sheet information detecting unit 110 is preferably an optical sensor that includes at least a specular reflection light receiving element that receives specular reflection light reflected on the surface of the sheet P and a diffused reflection light receiving element that receives diffused reflection light reflected on the surface of the sheet P. By so doing, scattered light beams of diffused reflection light to the sheet P can be detected by multiple sensors disposed at different angles, and therefore more precise detection results of information can be obtained than the information obtained from specular reflection light alone.

For detection of a thickness of the sheet P, the sheet information detecting unit 110 is used. Specifically, the light emitted by the light source 110a and transmitted through the sheet P is received by the light receiving element 110f. Based on the results obtained by this operation, the thickness of the sheet P can be detected.

The light receiving elements 110b, 110c, 110d, 110e, and 110f output respective electrical signals (current signals) corresponding to respective received light levels to the light emission processing unit 130.

As illustrated in FIG. 6, the light emission processing unit 130 includes a light source driver 131, a current-to-voltage converter 132, and an analog-to-digital (AD) converter 133.

The light source driver 131 outputs the light source driving signal to the light source 110a according to instructions issued by the processing device 180.

The current-to-voltage converter 132 converts current signals inputted by each light receiving element to voltage signals.

The AD converter 133 converts analog signals passing through the current-to-voltage converter 132 to digital signals and outputs the converted digital signals to the processing device 180.

As described in this example, by including information obtained by the light receiving element 110f that receives a transmitted light in addition to information obtained by the light receiving elements receiving the reflection light, the sheet discriminator 100 can discriminate the type of the sheet P more precisely.

Figure 7:
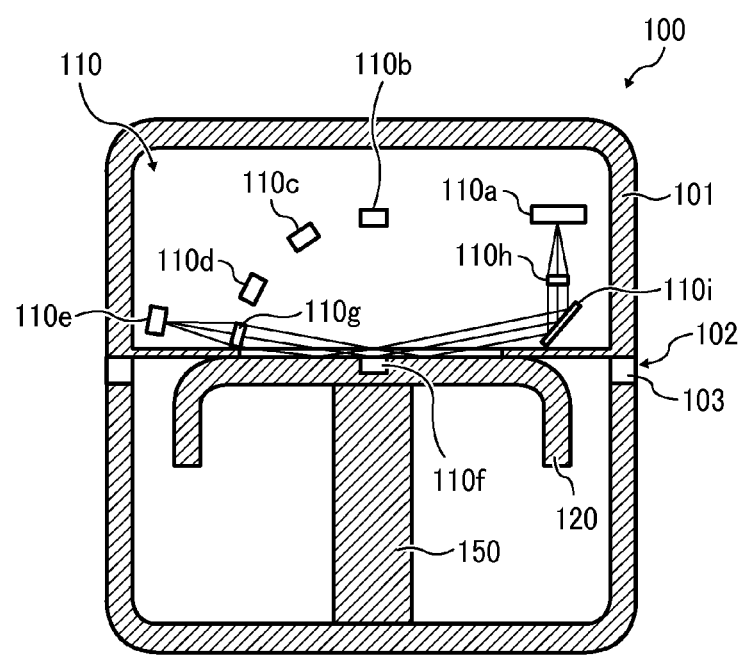
FIG. 7 is a diagram illustrating paths of specular reflection light when a sheet information detecting unit of the sheet discriminator in FIG. 6 discriminates the sheet.

FIG. 7 is a diagram illustrating paths of specular reflection light when the sheet information detecting unit 110 of the sheet discriminator 100 in FIG. 6 discriminates the sheet P. The light that is emitted by the light source 110a passes through the lens 110g. After reflecting on the mirror 110i, the light passes through the opening 110j and emits the sheet P. The specular reflection light of the light emitted onto the surface of the sheet P passed via the lens 110g and enters the light receiving element 110e.

It is to be noted that the opening 110j has a rectangular shape in order not to block a path of light emitted from the surface of the light source 110a to the sheet P and a path of specular reflection light reflected on the surface of the sheet P.

Figure 8:
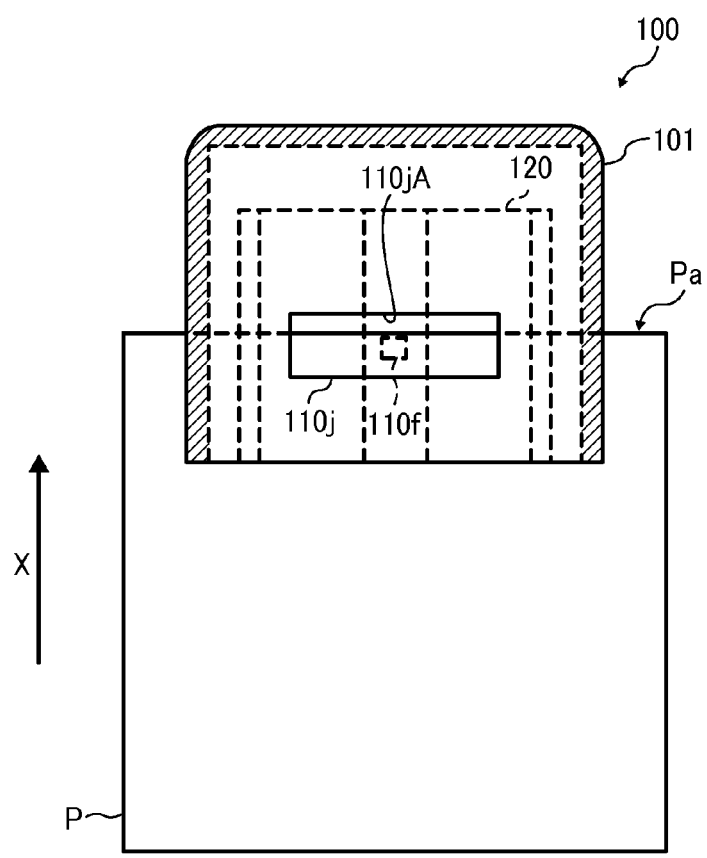
FIG. 8 is a cross sectional view illustrating an opening of a sheet discriminator according to another example of this disclosure, as viewed in a direction indicated by arrow C in FIG. 4.

FIG. 8 is a cross sectional view illustrating the opening 110j of the sheet discriminator 100 according to an example of this disclosure, as viewed in a direction indicated by arrow C in FIG. 4. In FIG. 8, the sheet P is inserted to the opening 110j. Further, the sheet P is biased by the biasing member 150 toward the front of the drawing sheet of FIG. 8.

As illustrated in FIG. 8, the opening 110j is a slot that has a long rectangular shape extending in a direction perpendicular to a sheet inserting direction X. Therefore, when a leading end Pa of the sheet P passes by a long side 110jA disposed at a downstream side of the opening 110j in the sheet inserting direction X, the leading end Pa of the sheet P and the long side 110jA are brought into a contact of lines or a line contact, therefore the sheet P is caught in the opening 110j. As a result, the sheet P is curled, and therefore is damaged.

When discriminating the type of a sheet by a comparative sheet distinguisher, a user inserts a sheet held in his/her hand between an optical sensor and a sheet loader through an opening provided to an external case of the comparative sheet distinguisher. The sheet information is detected by receiving the reflected light that is emitted from a light emitting element of the optical sensor and reflected on the sheet through the opening formed on a face facing the sheet loader of the external case.

However, when the sheet is inserted into the opening, the leading end of the sheet is caught by an edge of the opening, by which the sheet is damaged, for example, by folding of the sheet.

Figure 9:
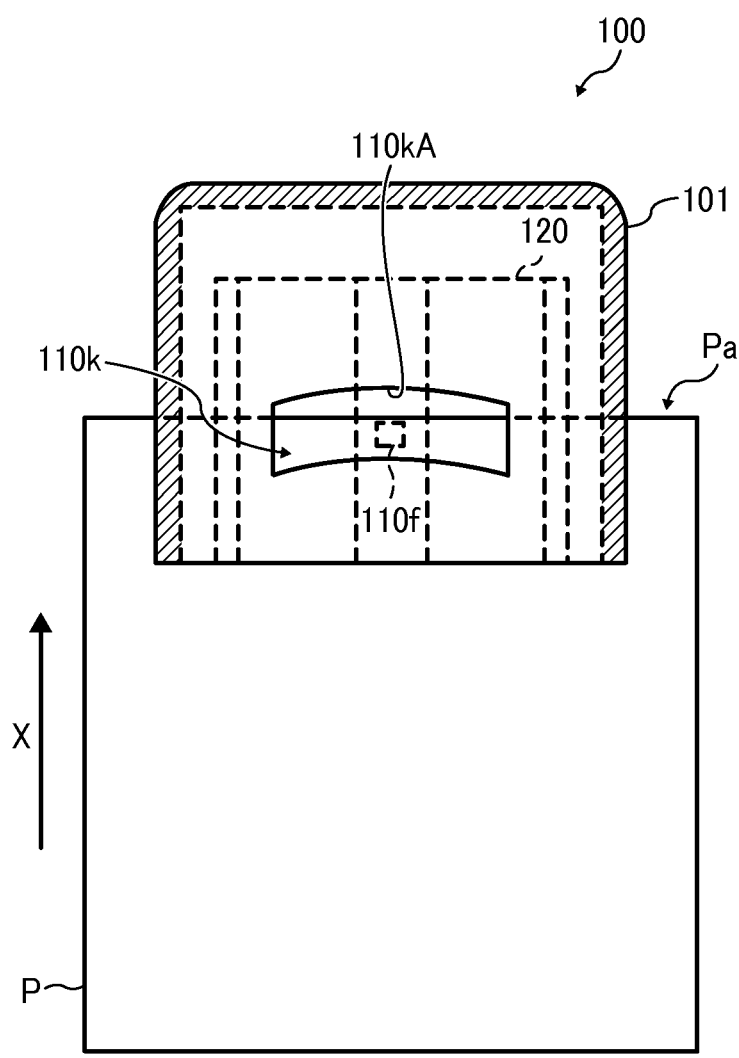
FIG. 9 is a cross sectional view illustrating configuration of an opening of the sheet discriminator according to an example of this disclosure, as viewed in a direction indicated by arrow C in FIG. 4.

FIG. 9 is a cross sectional view illustrating a configuration of an opening 110k of the sheet discriminator 100 according to an example of this disclosure, as viewed in the direction C in FIG. 4.

In the configuration according to the present example, as illustrated in FIG. 9, the sheet discriminator 100 has the opening 110k. A long side 110kA that is located at a downstream side in the sheet inserting direction X of the opening 110k has an arc shape that projects toward the downstream side in the sheet inserting direction X. Consequently, when the leading end Pa of the sheet P passes the long side 110kA of the opening 110k, the leading end Pa of the sheet P and the long side 110jA is brought into a contact of point and line, not a contact of lines. Therefore, the sheet P is not caught in the opening 110k easily, and as a result, the sheet P is not curled easily and can be prevented from being damaged.

Figure 10:
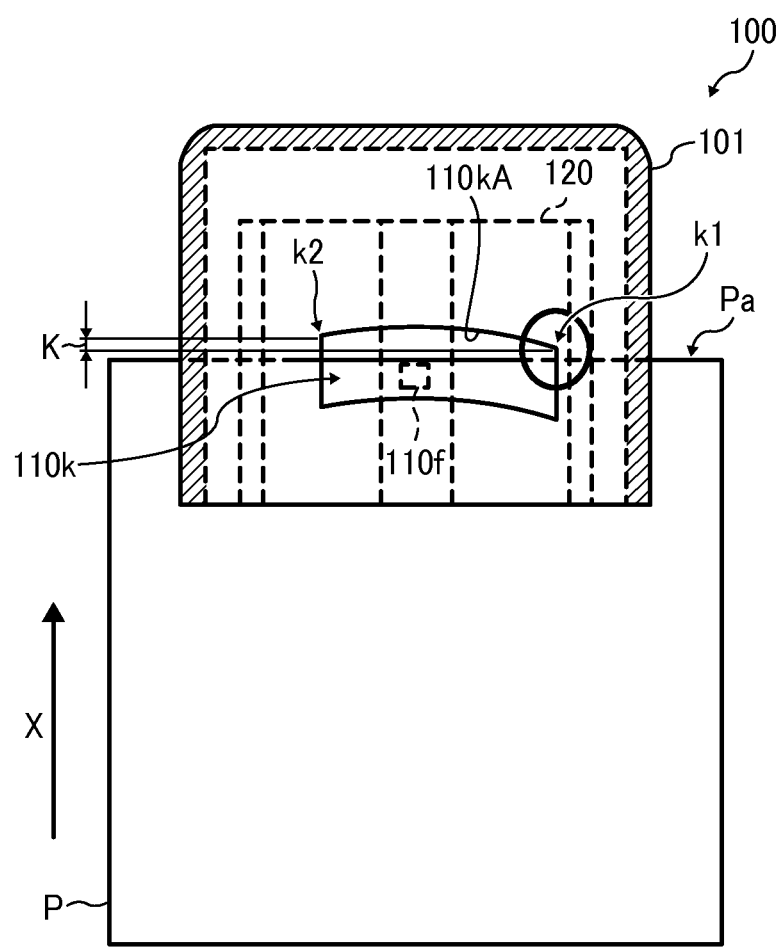
FIG. 10 is a cross sectional view illustrating a configuration of an opening of a sheet discriminator according to yet another example of this disclosure, as viewed in the direction indicated by arrow C in FIG. 4.

FIG. 10 is a cross sectional view illustrating a configuration of the opening 110k of the sheet discriminator 100 according to another example of this disclosure, as viewed in the direction C in FIG. 4.

In the configuration according to the present example, as illustrated in FIG. 10, the sheet discriminator 100 has the opening 110k. The long side 110kA that is located at the downstream side in the sheet inserting direction X of the opening 110k has an asymmetric arc shape that projects toward the downstream side in the sheet inserting direction X. The long side 110kA of the opening 110k extends in a direction perpendicular to the sheet inserting direction X of the arc-shaped opening 110k and has one end k1 and the other end k2.

According to this configuration, upon insertion of the sheet P into the sheet inserting part 102, the one end k1 of the long side 110kA contacts the leading end Pa of the sheet P prior to the other end k2 by a different K between the one end k1 and the other end k2 from the leading end Pa of the sheet P. In other words, the leading end Pa of the sheet P contacts one point alone on the long side 110kA upon insertion of the sheet P into the sheet inserting part 102 of the sheet discriminator 100. Therefore, this configuration of the opening 110k illustrated in FIG. 10 can reduce the number of contact points where the long side 110kA of the opening 110k and the leading end Pa of the sheet P contact. Consequently, the sheet P can be prevented from being caught at the long side 110kA of the opening 110k.

Figure 11:
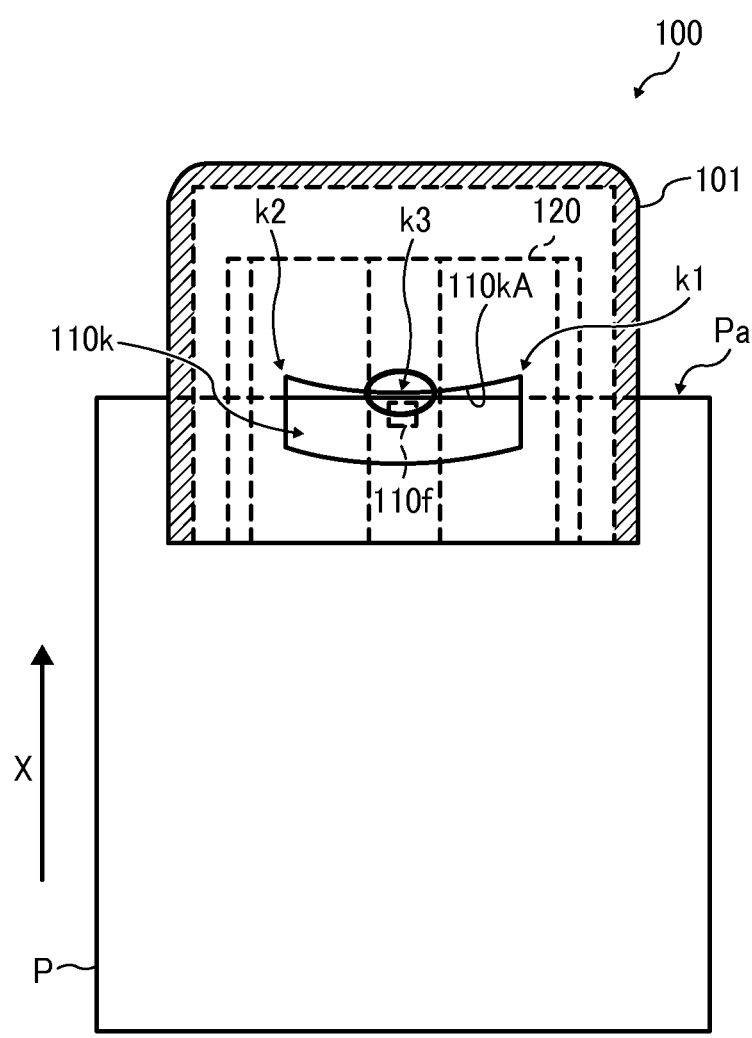
FIG. 11 is a cross sectional view illustrating a configuration of an opening of a sheet discriminator according to yet another example of this disclosure, as viewed in the direction indicated by arrow C in FIG. 4.

FIG. 11 is a cross sectional view illustrating a configuration of the opening 110k of the sheet discriminator 100 according to yet another example of this disclosure, as viewed in the direction C in FIG. 4.

In the configuration according to the present example, as illustrated in FIG. 11, the sheet discriminator 100 has the opening 110k. The long side 110kA that is located at the downstream side in the sheet inserting direction X of the opening 110k has an arc shape that projects toward an upstream side in the sheet inserting direction X. That is, the arc shape of the opening 110k according to the present example is turned or inverted along the sheet inserting direction X to the arc shape of the opening 110k of FIG. 11 is turned or inverted to the arc shape of the opening 110k of FIG. 11 along the sheet inserting direction X. In addition to the one end k1 and the other end k2, the long side 110kA of the opening 110k has an arc part k3.

By forming the long side 110kA to the arc shape projecting toward the upstream side in the sheet inserting direction X, the arc part k3 having an arc shape contacts the leading end Pa of the sheet P prior to both ends in the sheet inserting direction X, which are the one end k1 and the other end k2. According to this configuration, upon insertion of the sheet P into the sheet inserting part 102, the arc part k3 and the leading end Pa of the sheet P contact at the long side 110kA. In other words, the long side 110kA and the leading end Pa of the sheet P can contact at a single contact point upon insertion of the sheet P into the sheet inserting part 102 of the sheet discriminator 100. Consequently, the configuration illustrated in FIG. 11 can reduce the number of contact points of the long side 110kA and the leading end Pa of the sheet P than the configuration illustrated in FIG. 9. As a result, this configuration illustrated in FIG. 11 can further reduce or prevent the leading end Pa of the sheet P from being caught by the long side 110kA of the opening 110l.

Figure 12:
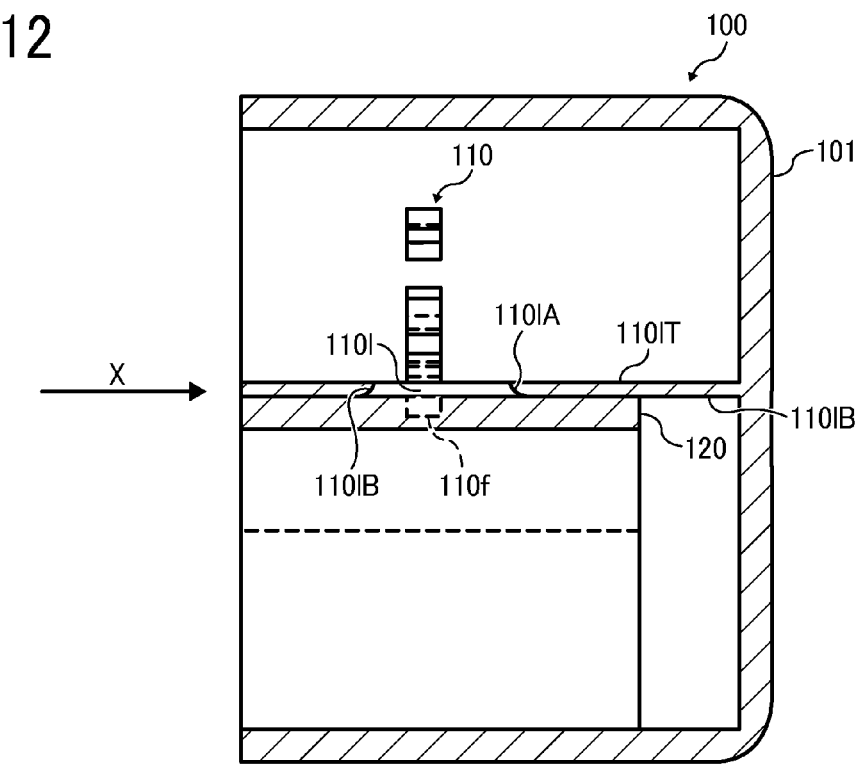
FIG. 12 is a cross sectional view illustrating a configuration of an opening of a sheet discriminator according to yet another example of this disclosure, as viewed in a direction indicated by arrow A in FIG. 1.
Figure 13:
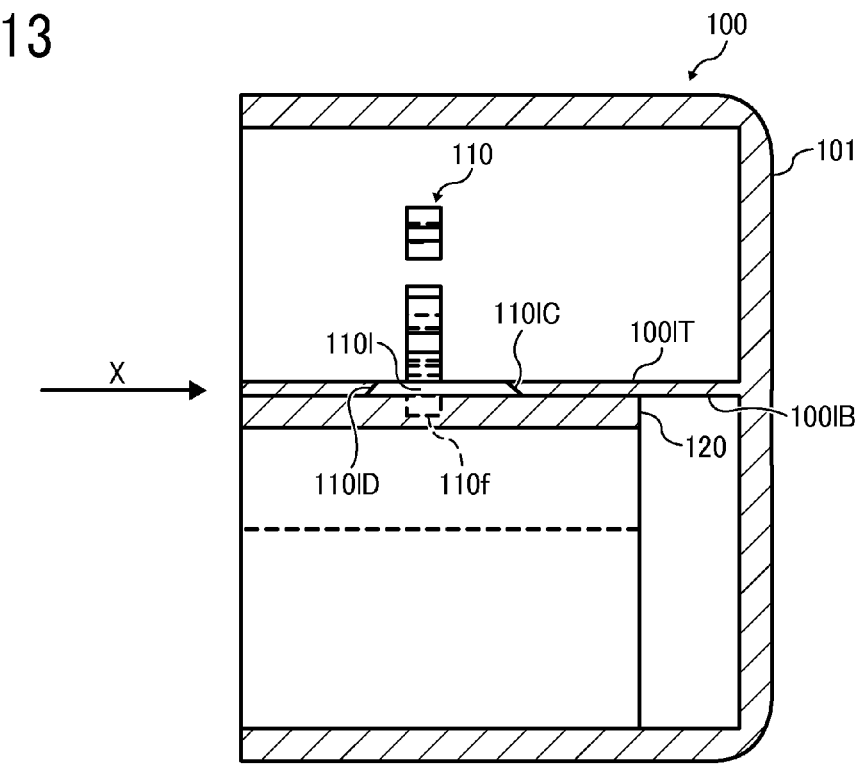
FIG. 13 is a cross sectional view illustrating a configuration of an opening of a sheet discriminator according to yet another example of this disclosure, as viewed in a direction indicated by arrow A in FIG. 1.

FIGS. 12 and 13 are cross sectional views illustrating respective configuration of an opening 110l of the sheet discriminator 100 according to yet another example of this disclosure, as viewed in a direction indicated by arrow A in FIG. 1.

The opening 110l illustrated in FIG. 12 is a slot that has a long rectangular shape extending in the direction perpendicular to the sheet inserting direction X. The opening 110l has a long side 110lA at a downstream side thereof in the sheet inserting direction X and a long side 110lB at an upstream side thereof in the sheet inserting direction X. Both of the long sides 110lA and 110lB are formed in an R-shape at an inner side of the opening 110l where the sheet P faces when inserted thereinto. By forming the long side 110lA in an arc-shape at the downstream side in the sheet inserting direction X of the opening 110l, the sheet P can be guided smoothly, thereby preventing the leading end Pa of the sheet P from getting caught by the long side 110lA of the opening 110l.

Further, if the opening 110l is formed from molding, the long side 110lB at the upstream side in the sheet inserting direction X of the opening 110l is formed in an arc-shape. By so doing, a parting line at which two closed dies or two halves of a mold meet is reliably made on a bottom face 110lB opposite to a top face 110lT from which the sheet P is inserted. Therefore, this configuration can prevent burr to be generated on the upstream side in the sheet conveying direction of the opening 110l, and therefore can prevent the sheet P from being caught at the opening 110l. Further, even if the long side 110lB is formed in not an arc-shape but in a chamfered shape at the upstream side in the sheet conveying direction of the opening 110l, this configuration can provide the same effect as the configuration in which the long side 110lB is formed in an arc-shape.

The opening 110l illustrated in FIG. 13 is a slot that has a long rectangular shape extending in the direction perpendicular to the sheet inserting direction X, which is the same as the opening 110l illustrated in FIG. 12. In FIG. 13, both of the long sides 110lC and 110lD are formed in a chamfered shape at an inner side of the opening 110l where the sheet P faces when inserted thereinto. By forming the long side 110lC in a chamfered shape at the downstream side in the sheet inserting direction X of the opening 110l, the sheet P can be guided smoothly, thereby preventing the leading end Pa of the sheet P from getting caught by the long side 110lC of the opening 110l.

It is to be noted that the opening 110l of FIG. 13 can achieve substantially the same effect as the opening 110l of FIG. 12.

Further, as described with reference to FIG. 9, by forming the long sides 110lA and 110lB of the opening 110l in the arc shape, the leading end Pa of the sheet P can be prevented from being caught by the long sides 110lA and 110lB of the opening 110l. Consequently, the greater effect can be achieved.

Now, a description is given of the image forming system 1 according to another example of this disclosure.

It is to be noted that the basic configuration and functions of the image forming system 1 according to the present example can be applied as the identical configuration of the image forming system 1 illustrated in FIGS. 1 through 12. Therefore, the descriptions of the basic configuration and functions of the image forming system 1 according to the present example are omitted or summarized and a detailed description of the sheet discriminator 100 according to the present example is described.

Figure 14:
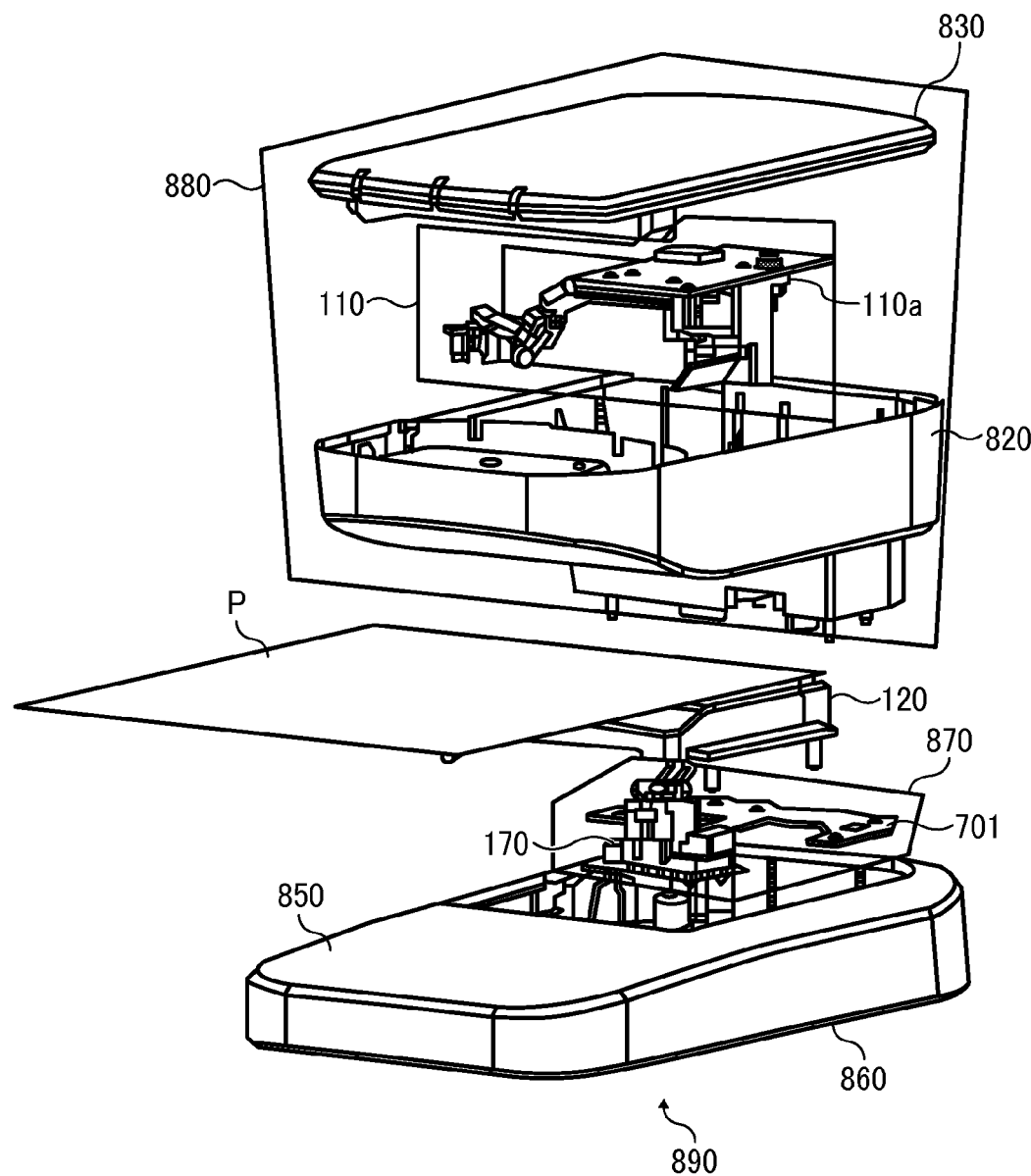
FIG. 14 is an exploded perspective view illustrating a sheet discriminator according to yet another example of this disclosure.

FIG. 14 is an exploded perspective view illustrating the sheet discriminator 100 according to an example of this disclosure.

The sheet discriminator 100 includes a sheet information detector module 880, a sheet thickness detecting unit 870, the sheet loading table 120, and a base unit 890.

Figure 15:
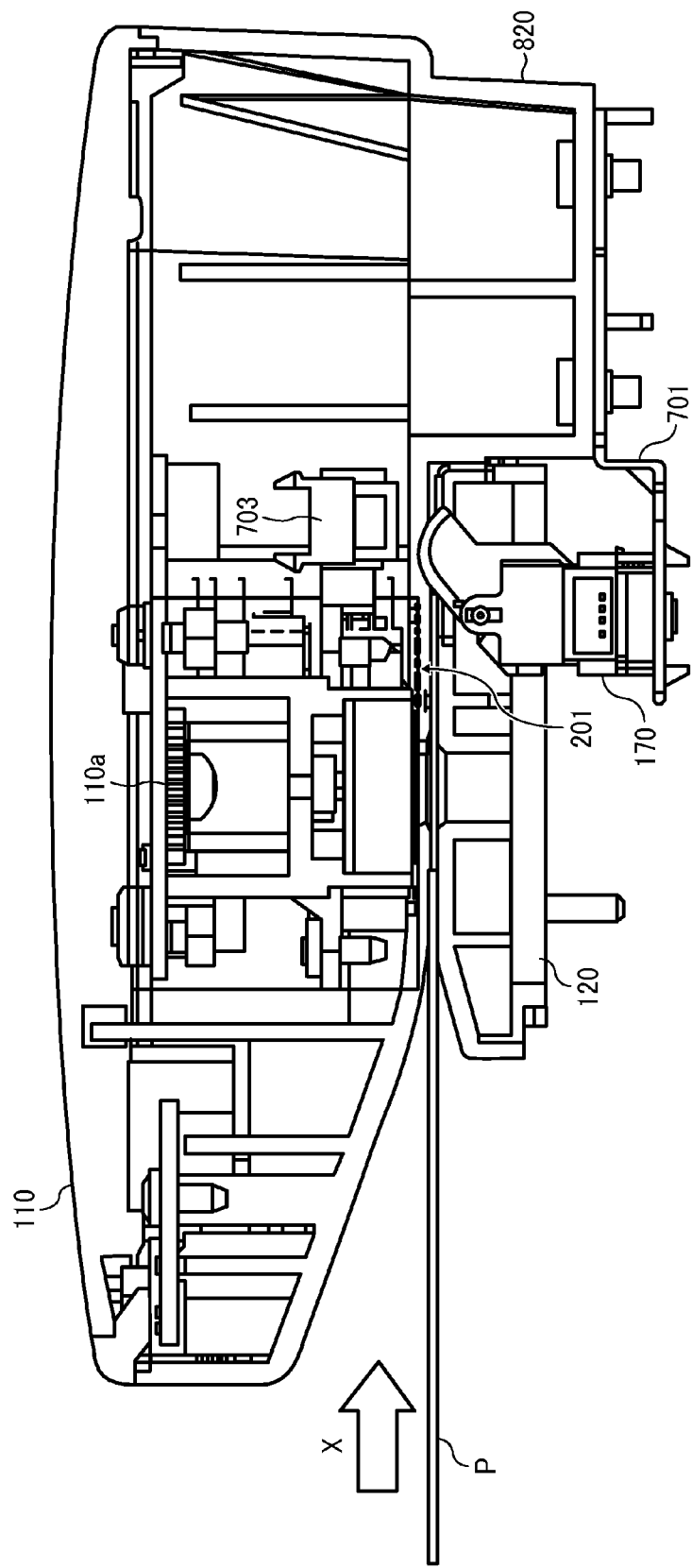
FIG. 15 is a diagram illustrating a configuration of the sheet discriminator when discriminating a sheet type.

The sheet information detector module 880 functions as a detector body to include the sheet information detecting unit 110, a case 820, a cover 830, and a sheet detecting sensor 703 (see FIG. 15).

The sheet information detecting unit 110 includes the light source 110a. The cover 830 covers the case 820. The sheet detecting sensor 703 detects whether or not the sheet P is inserted in the sheet discriminator 100.

The light source 110a functions as a light emitter and includes multiple light emitting elements, which are vertical cavity surface emitting laser (VCSEL). The sheet detecting sensor 703 is a reflective photosensor. The case 820 holds the sheet information detecting unit 110 and includes a measurement datum plane 201 (see FIG. 18) used when measuring the thickness of the sheet P.

It is to be noted that the configuration of the sheet information detecting unit 110 and detection principle of sheet information performed in the sheet information detecting unit 110 are the same as those described with reference to FIGS. 1 through 12.

The sheet thickness detecting unit 870 includes the sheet thickness detecting sensor 170 and a sensor attaching bracket 701.

The sheet thickness detecting sensor 170 is an encoder that functions as a displacement unit to detect an amount of displacement according to thickness of the sheet P.

The sensor attaching bracket 701 holds the sheet thickness detecting sensor 170. The sensor attaching bracket 701 is formed by engineering plastics having excellent rigidity such as ABS (Acrylonitrile-Butadiene-Styrene) resin or by metallic material.

The base unit 890 includes a base 860 and a cover 850 that covers the base 860.

The sheet thickness detecting unit 870 is provided inside the base 860. The sheet loading table 120 is attached to the base 860 to load the sheet P thereon. The sheet information detector module 880 is supported by the base unit 890.

The sheet P is inserted between the sheet information detector module 880 and the sheet loading table 120. By so doing, the information of the sheet P for discriminating the type of the sheet P is detected by the sheet information detector module 880 and the sheet thickness detecting sensor 170.

FIG. 15 is a diagram illustrating a configuration of the sheet discriminator 100 when the sheet discriminator 100 discriminates a type of the sheet P.

It is to be noted that the base unit 890 is omitted in FIG. 15, for convenience.

A side of the sensor attaching bracket 701, which is opposite to another side on which the sheet thickness detecting sensor 170 is mounted, is fixed by a screw or screws to a lower part of the case 820. As illustrated in FIG. 15, the sheet P is inserted into a gap formed between the case 820 and the sheet loading table 120 of the sheet discriminator 100 in the sheet inserting direction X.

The sheet loading table 120 is movable in a vertical direction and is pressed by a compression spring in an upward direction from below, so as to be constantly pushed up toward the case 820. Since the sheet loading table 120 is lifted toward the case 820, the sheet P inserted into the gap formed between the case 820 and the sheet loading table 120 is held between the case 820 and the sheet loading table 120, thereby being retained in the sheet discriminator 100. The measurement datum plane 201 is included in the case 820 to function as a reference plane and is disposed facing the sheet loading table 120. The sheet P that is sandwiched between the measurement datum plane 201 and the sheet loading table 120 is constantly pressed up to the measurement datum plane 201 by the sheet loading table 120.

In FIG. 15, the sheet P is inserted between the measurement datum plane 201 that is a lower face of the case 820 and the sheet loading table 120 of the sheet discriminator 100 in the sheet inserting direction X. The sheet loading table 120 includes the biasing member 150 such as a spring that is attached to a position facing the sheet information detecting unit 110. Accordingly, the sheet loading table 120 is biased by the biasing member 150 toward the measurement datum plane 201. The surface of the sheet P inserted between the measurement datum plane 201 and the sheet loading table 120 is pressed against the measurement datum plane 201 by the sheet loading table 120.

When the sheet information detecting unit 110 detects sheet information, the light source 110a emits laser light toward the surface of the sheet P. Since the surface of the sheet P is pressed onto the measurement datum plane 201, the sheet information detecting unit 110 takes the measurement datum plane 201 as a reference face for the measurement of the sheet P. Further, when the sheet thickness detecting sensor 170 measures the thickness of the sheet P, the measurement datum plane 201 functions as a reference face form the measurement of thickness of the sheet P.

In the sheet discriminator 100 illustrated in FIG. 15, the sheet detecting sensor 703 is disposed downstream from the sheet information detecting unit 110 in the sheet inserting direction. That is, the sheet information detecting unit 110 and the sheet detecting sensor 703 are aligned side by side. The sheet detecting sensor 703 is connected to the controller, similar to the sheet information detecting unit 110. Based on detection results obtained by the sheet detecting sensor 703, the controller determines whether or not to start or stop detection of information of the sheet P by the sheet information detecting unit 110 via the controller.

When the sheet detecting sensor 703 functioning as a reflective photosensor detects that the sheet P is inserted into the sheet discriminator 100, the controller starts the measurement of the sheet P. As the measurement of the sheet P starts, the light source 110a of the sheet information detecting unit 110 emits the surface of the sheet P and the sheet information detecting unit 110 detects the condition of the sheet P. At the same time, the sheet thickness detecting sensor 170 measures the thickness of the sheet P.

Figure 16:
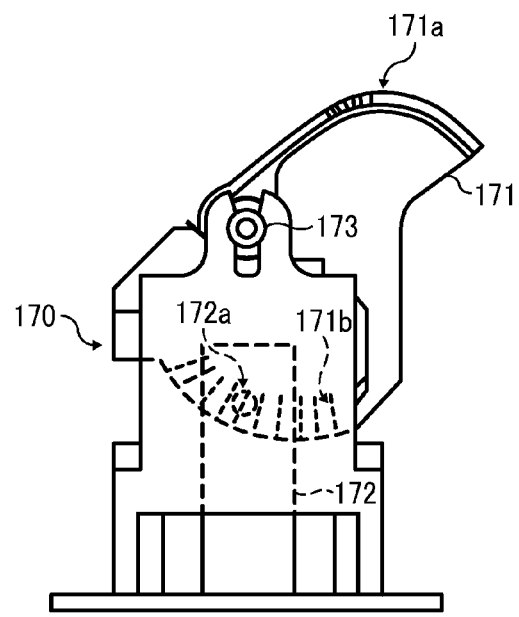
FIG. 16 is a diagram illustrating a sheet thickness detecting sensor.

FIG. 16 is a diagram illustrating the sheet thickness detecting sensor 170.

The sheet thickness detecting sensor 170 is an encoder that functions as a displacement detector to detect an amount of displacement according to the thickness of the sheet P. As illustrated in FIG. 16, the sheet thickness detecting sensor 170 includes an encoder feeler 171 and a transmission type optical sensor 172.

The encoder feeler 171 rotates about a rotary shaft 173 and functions as a displacement gauge that has multiple slits 171b formed at constant angled pitches. An upper end 171a of the encoder feeler 171 is in contact with the measurement datum plane 201 (FIG. 15) that is a bottom face of the sheet information detecting sensor 170, which functions as an opposing member.

The transmission type optical sensor 172 that functions as a displacement detector has a sensor part 172a and detects the multiple slits 171b of the encoder feeler 171 at the sensor part 172a.

Figure 17:
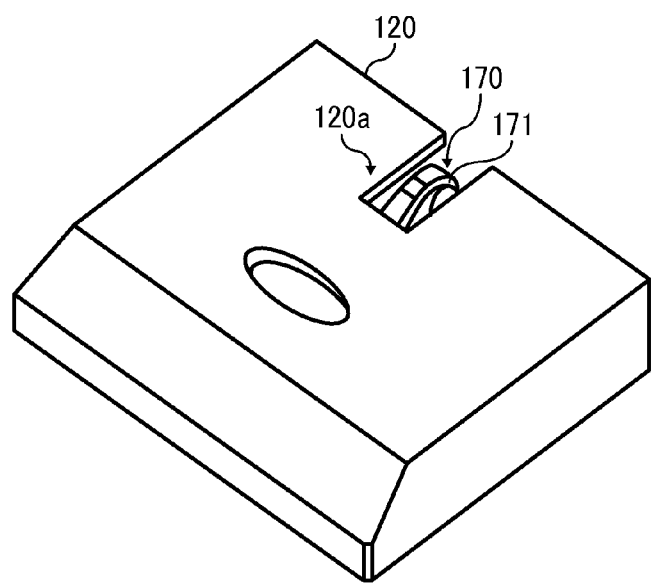
FIG. 17 is a perspective view illustrating a sheet loading table and the sheet thickness detecting sensor of the sheet discriminator.

FIG. 17 is a perspective view illustrating the sheet loading table 120 and the sheet thickness detecting sensor 170 of the sheet discriminator 100.

As illustrated in FIG. 17, an upper part of the encoder feeler 171 of the sheet thickness detecting sensor 170 is exposed to the outside from a slit 120a formed on the sheet loading table 120 so that the upper part of the encoder feeler 171 is located on a path of insertion of the sheet P in the gap formed between the measurement datum plane 201 and the sheet loading table 120.

When the sheet P is not inserted in the sheet inserting part 102, the encoder feeler 171 is located at an initial position at which an upper end 171a of the encoder feeler 171 is in contact with the measurement datum plane 201 that is the bottom face of the sheet information detecting sensor 170, which functions as an opposing member. It is to be noted that the measurement datum plane 201 is a reference used when the sheet P is inserted into the sheet discriminator 100. When the encoder feeler 171 is at the initial position, the sheet P is not sandwiched by the encoder feeler 171 and the sheet information detecting unit 110, and therefore the sheet thickness detecting sensor 170 detects the thickness of the sheet P as "0".

Figure 18A:
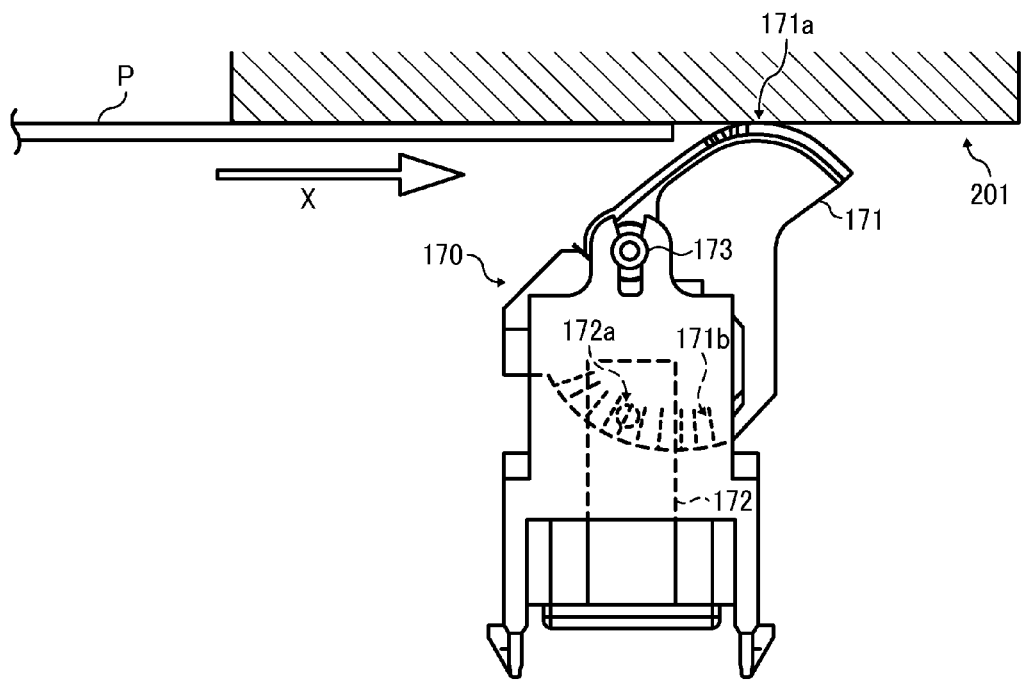
FIG. 18A is a diagram illustrating a state immediately before the sheet passes a contact position of an upper end of the feeler and a bottom face of a sheet information detecting sensor.
Figure 18B:
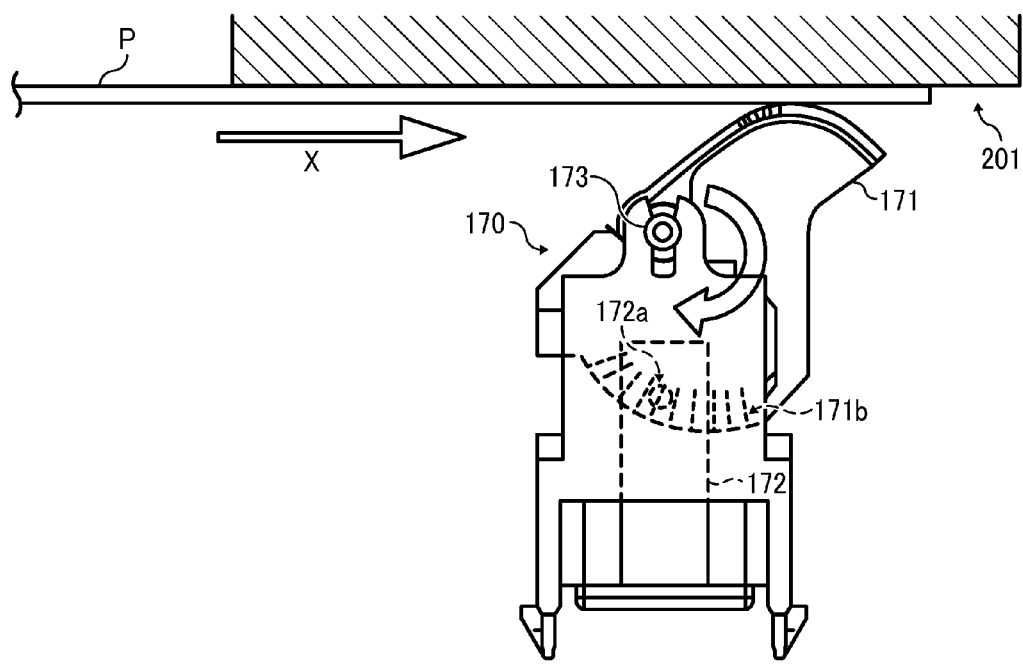
FIG. 18B is a diagram illustrating a state in which the sheet is passing the contact position of FIG. 18A.

FIG. 18A is a diagram illustrating a state immediately before the sheet P passes a contact position of the upper end 171a of the feeler and a bottom face of the sheet information detecting unit 110. FIG. 18B is a diagram illustrating a state in which the sheet P is passing the contact position of FIG. 18A.

As illustrated in FIG. 18A, when the sheet P is inserted into the sheet inserting part 102 to pass the contact position where the upper end 171a of the encoder feeler 171 and the measurement datum plane 201, the sheet P presses the encoder feeler 171. Consequently, as illustrated in FIG. 18B, the encoder feeler 171 rotates about the rotary shaft 173 thereof in a clockwise direction in FIG. 18B. Accordingly, the sheet P is sandwiched between the encoder feeler 171 and the sheet information detecting unit 110.

At this time, the optical sensor 172 detects the multiple slits 171b passing a position facing a sensor part 172a thereof, and a rotation amount of the encoder feeler 171 is obtained based on detection results of the optical sensor 172. The thus obtained rotation amount of the encoder feeler 171 is then converted to an amount of thickness of the sheet P by a given expression or equation. Accordingly, the thickness of the sheet P can be obtained. It is to be noted that a resolution to convert the obtained rotation amount to a thickness is 5 μm.

Figure 19:
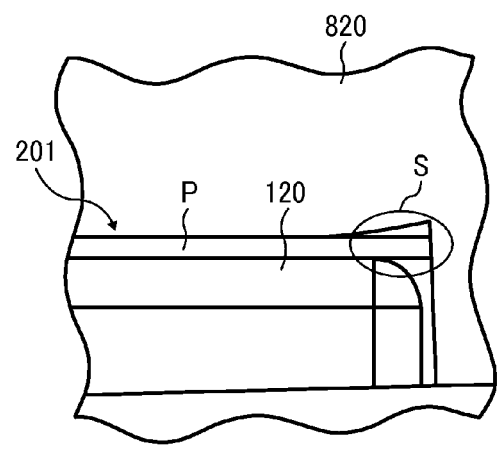
FIG. 19 is a diagram illustrating a neighboring area of a leading end of a plain sheet when a plain sheet is inserted into the sheet discriminator.

FIG. 19 is a diagram illustrating a neighboring area of the leading end Pa of the plain sheet P when the plain sheet P is inserted into the sheet discriminator 100.

When the sheet P is inserted into the sheet discriminator 100, the sheet P is lifted up by the sheet loading table 120. The sheet P is pressed against the measurement datum plane 201 of the sheet P and is retained. In this state, the thickness of the plain sheet P is measured and the sheet P is discriminated by laser.

Figure 20A:
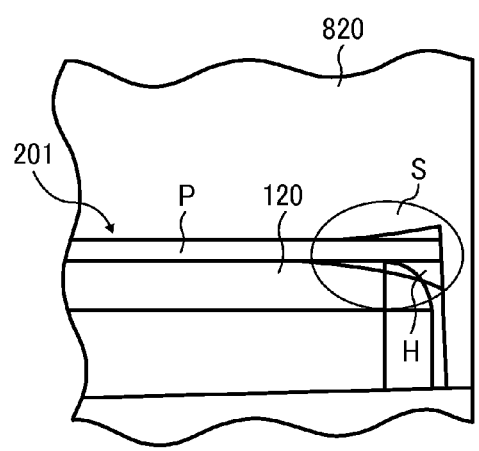
FIG. 20A is a diagram illustrating the neighboring area of the leading end of a sheet having deformation such as cut burr when the sheet is inserted into the sheet discriminator.
Figure 20B:
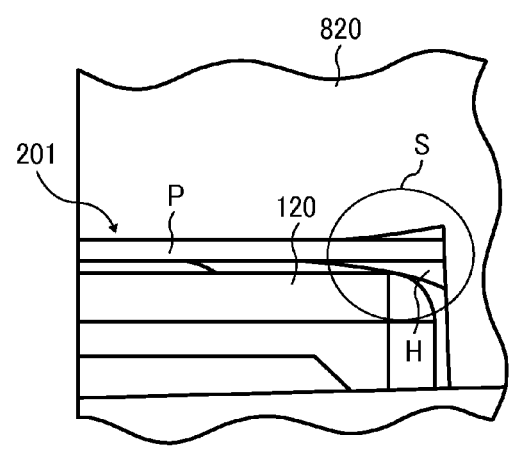
FIG. 20B is a diagram illustrating the neighboring area of the leading end of the sheet with a gap between a measurement datum plane and a sheet loading table.

FIG. 20A is a diagram illustrating the neighboring area of the leading end Pa of a sheet P having deformation such as cut burr when the sheet P is inserted into the sheet discriminator 100. FIG. 20B is a diagram illustrating the neighboring area of the leading end Pa of the sheet P with a gap between the measurement datum plane 201 and the sheet loading table 120.

As illustrated in FIG. 20A, when the sheet P has deformation such as cut burr and curl at the leading end Pa, a deformed portion H hinders the sheet loading table 120 to lift the sheet P toward the measurement datum plane 201. Therefore, as illustrated in FIG. 20B, a gap is formed between the measurement datum plane 201 and the sheet loading table 120. Consequently, the sheet P cannot be held reliably, and therefore the position and statue of the sheet P becomes unstable when measuring the thickness of the sheet P. As a result, the measurement results obtained by the sheet thickness detecting sensor 170 vary.

Deformation at the leading end Pa of the sheet P does not matter when the sheet P is rather thin. The thin sheet P can change the shape following the measurement datum plane 201 when pressed to the measurement datum plane 201 by the sheet loading table 120.

By contrast, when the sheet P is rather thick and has a weight of, for example, 200 g/m$^2$ or greater, the sheet P has a great rigidity, so that the sheet P does not follow the measurement datum plane 201 and easily forms deformation as described above.

Figure 21:
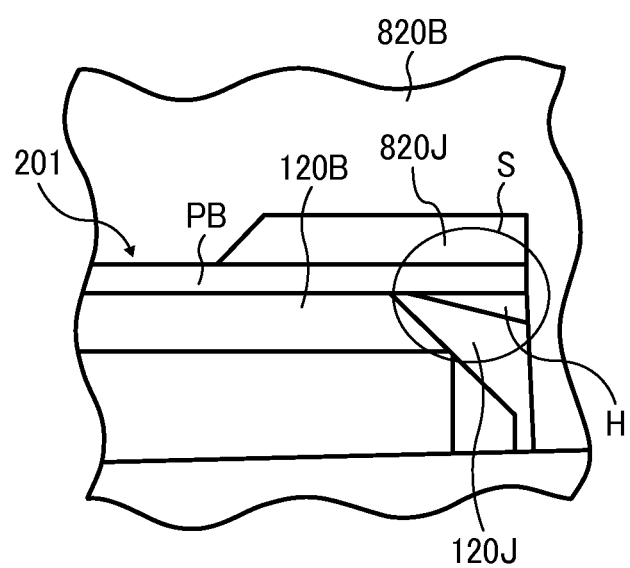
FIG. 21 is a diagram illustrating the neighboring area of the leading end of a sheet having deformation such as cut burr when the sheet is inserted into the sheet discriminator having a recess on the case and/or the sheet loading table.

FIG. 21 is a diagram illustrating the neighboring area of the leading end Pa of the sheet P having deformation such as cut burr when the sheet P is inserted into the sheet discriminator 100 having recesses 820J and 120J on a case 820B and a sheet loading table 120B, respectively.

To address the above-described inconvenience, the case 820B has a recessed portion that is recessed from the measurement datum plane 201 and faces an end of the sheet P when the sheet P is located at an information detectable position at which information of the sheet P is detected by the sheet information detecting unit 110. In addition, the sheet loading table 120B has a recessed portion that is recessed therefrom than the other part and faces the end of the sheet P when the sheet P is located at the information detectable position. In other words, the case 820B and the sheet loading table 120B illustrated in FIG. 21 are cut and change a level by a certain amount at respective portions where the end of the sheet P contacts, thereby forming recesses 820J and 120J recessed and uncontacted from the measurement datum plane 201.

By forming the recesses 820J and 120J as described above, even if the end of the sheet P is deformed with cut burr and/or curl, the sheet loading table 120B can lift the sheet P toward the case 820B reliably without being interfered by deformation of the sheet P. Therefore, the sheet P and the measurement datum plane 201 contact without forming any gap and, as a result, the sheet thickness detecting sensor 170 can measure the thickness of the sheet P accurately.

Further, as the configurations illustrated in FIGS. 9 through 11, at least one side of the opening 110k formed on the measurement datum plane 201 that is a lower face of the case 820 has an arc shape, so that the leading end Pa of the sheet P does not get caught at the arc-shaped side of the opening 110k easily.

Further, as the configuration illustrated in FIG. 12, at least one side in the sheet inserting direction of the opening 110l has an arc shape or a chamfered shape. With this configuration, the sheet P is guided smoothly by the at least one side having the arc shape or the chamfered shape, and thereby preventing the leading end Pa of the sheet P from being caught at the arc-shaped or chamfered side of the opening 110l. By thus forming the opening 110l, the sheet P does not have deformation such as curl, thereby preventing the sheet P from being damaged.

Now, a description is given of the image forming system 1 including the sheet discriminator 100 according to another example of this disclosure.

It is to be noted that the basic configuration and functions of the image forming apparatus 2 including the sheet discriminator 100 according to the present example can be applied as the identical configuration of the image forming apparatus 2 illustrated in FIGS. 13 through 21. Therefore, the descriptions of the basic configuration and functions of the image forming apparatus 2 including the sheet discriminator 100 according to the present example are omitted or summarized.

Figure 22A:
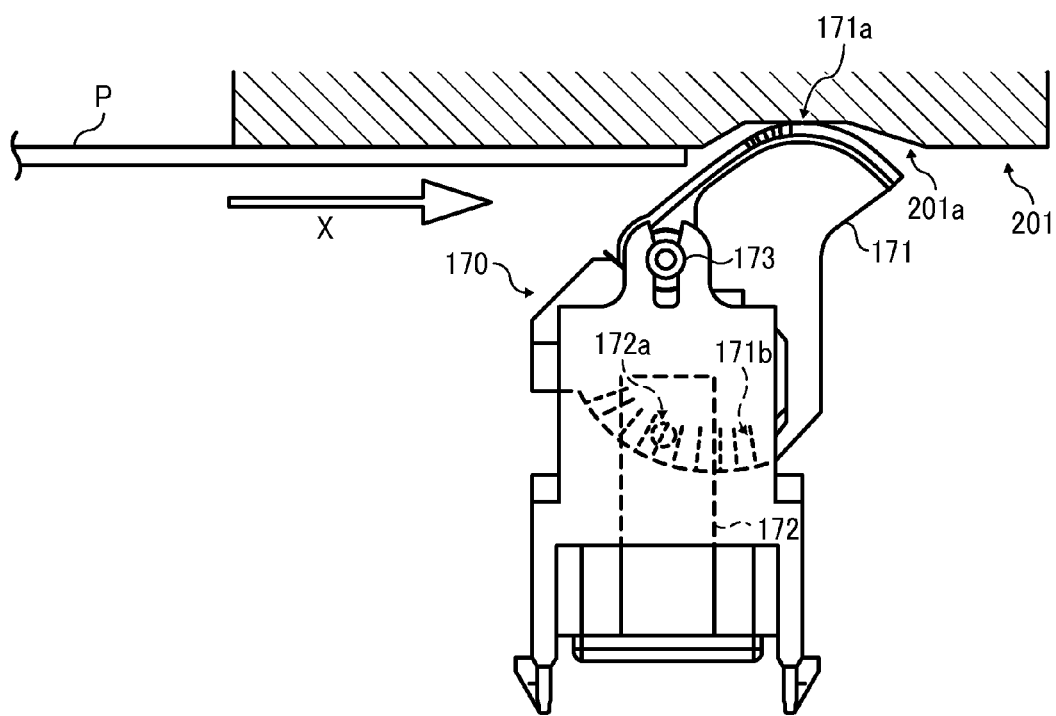
FIG. 22A is a diagram illustrating a state in which an upper end of an encoder contacts a recess of a measurement datum plane.
Figure 22B:
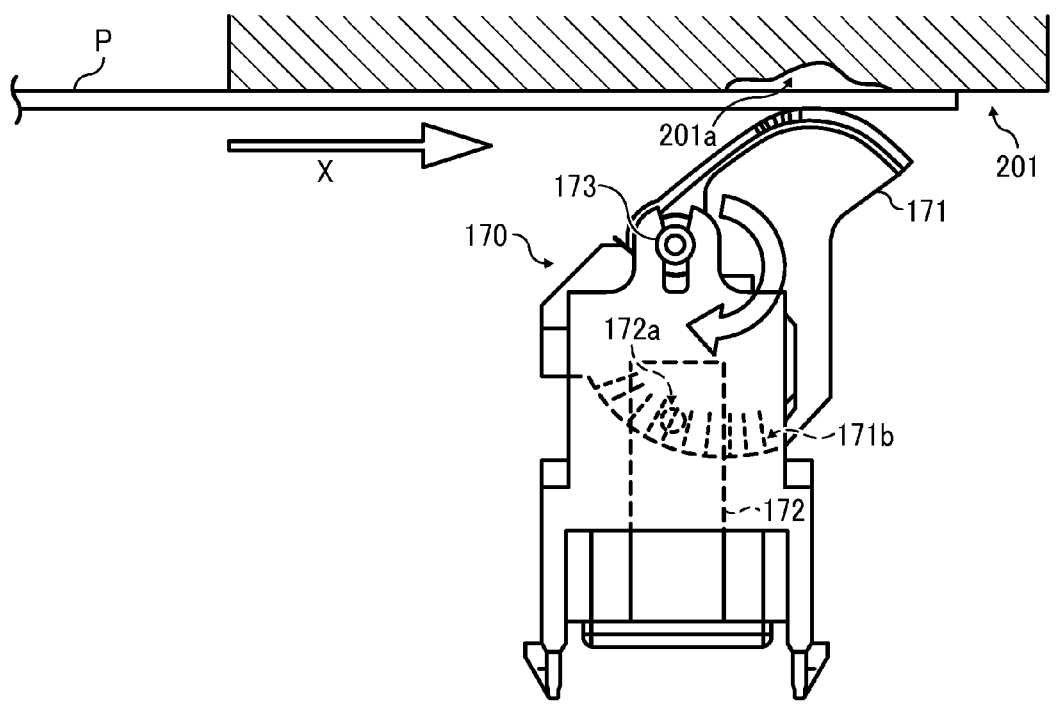
FIG. 22B is a diagram illustrating a state in which a thick sheet is inserted between an upper end of an encoder feeler and a measurement datum plane.
Figure 23:
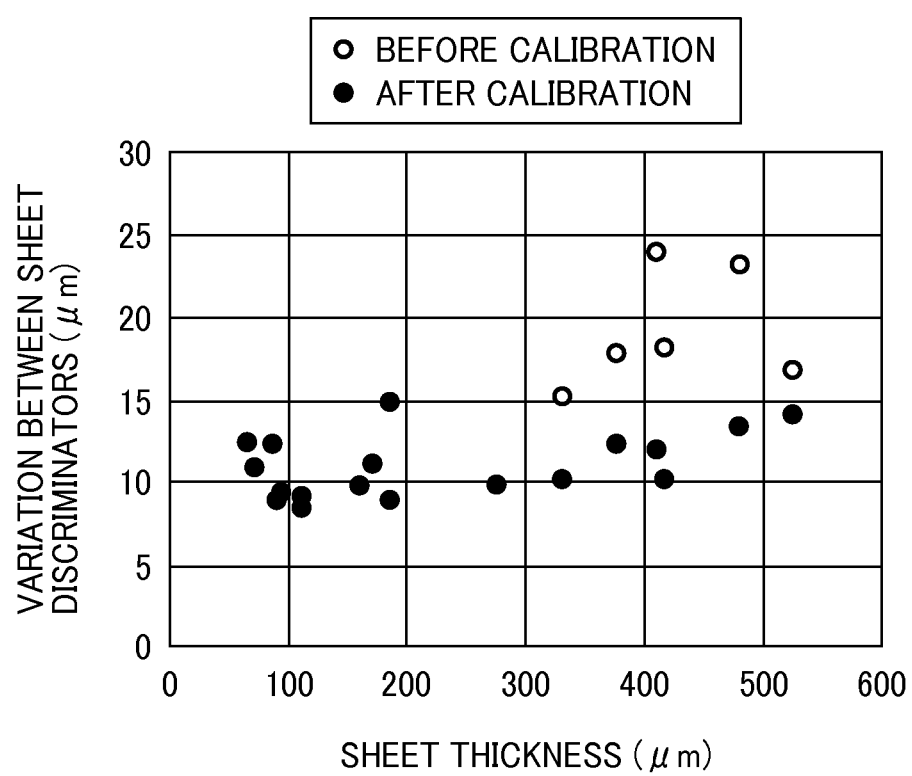
FIG. 23 is a graph showing a relation of an actual thickness of the sheet and variation of sheet thicknesses between multiple sheet discriminator.

In the present example, a description is given of handlings performed by the sheet discriminator 100 when discriminating a thickness of the sheet P, with reference to FIGS. 22 through 24.

FIG. 22A is a diagram illustrating a state in which the upper end 171a of the encoder feeler 171 provided to the sheet thickness detecting sensor 170 contacts a recess 201a of the measurement datum plane 201. FIG. 22B is a diagram illustrating a state in which a thick sheet P is inserted between the upper end 171a of the encoder feeler 171 and the measurement datum plane 201.

As illustrated in FIG. 22A, a contact part that is a part on the measurement datum plane 201 to which the upper end 171a of the encoder feeler 171 provided to the sheet thickness detecting sensor 170 contacts may be dented or recessed due to processing failure. If the measurement datum plane 201 has the recess 201a on the contact part to which the upper end 171a of the encoder feeler 171 contacts, the following inconveniences can occur.

For example, as illustrated in FIG. 22B, when a thick sheet P is inserted between the upper end 171a of the encoder feeler 171 and the measurement datum plane 201, the encoder feeler 171 rotates more than an amount of rotation in a clockwise direction in FIG. 22B when the actual thickness of the sheet P is detected. As a result, the sheet thickness detecting sensor 170 misdetects the thickness of the sheet P as the sheet P has a thickness thicker than the actual thickness of the sheet P.

When the sheet P is a thick paper, the sheet P does not follow the recess 201a of the measurement datum plane 201 due to the rigidity thereof. Therefore, the thickness of the sheet P is misdetected by the depth of the recess 201a. Consequently, a significant difference is generated between the actual thickness of the sheet P and the measured value of thickness of the sheet P.

By contrast, when the sheet P is a thin paper, the sheet P follows the recess 201a of the measurement datum plane 201. Therefore, no significant difference is generated between the actual thickness of the sheet P and the measured value of thickness of the sheet P.

After various sheet thicknesses have checked, it was found that a sheet thickness of about 300 μm is a threshold of whether or not a significant difference is generated between an actual sheet thickness and a measured value of thickness of a sheet.

As illustrated in FIG. 6, the sheet discriminator 100 includes the sheet thickness detecting sensor 170, the processing device 180, and the memory 181. It is to be noted that the configuration of the sheet discriminator 100 according to the present example is identical to the configuration of FIG. 6.

In the present example, a calibration value to calibrate a difference between an actual sheet thickness and the measured value of thickness of the sheet P measured by the sheet thickness detecting sensor 170 of the sheet discriminator 100 is stored in the memory 181. When the thickness of the sheet P is thick, the processing device 180 can calibrate the measured value of the thickness of the sheet P by using the calibration value stored in the memory 181.

It is to be noted that the memory 181 and the processing device 180 may be provided to the image forming apparatus 2 instead of the sheet discriminator 100 and communicate between the sheet discriminator 100 and the image forming apparatus 2.

For obtaining a calibration value, the thickness of a sheet having a value stored in the memory 181 is measured before the thickness of another sheet having a value not stored in the memory 181. Then, the processing device 180 determines a calibration value by using a difference between the measured value and the actual value (or a reference value previously stored in the memory 181) and the measured value of the sheet, and stores the calibration value in the memory 181. The calibration value may be multiple calibration values according to different thicknesses of various sheets. The multiple calibration values can be stored in the memory 181 so that the processing device 180 can change the calibration value used for calibration according to the sheet thicknesses. By so doing, an appropriate calibration value according to the thickness of the sheet P can be used.

FIG. 23 is a graph showing a relation of an actual thickness of the sheet P and variation of thicknesses of the sheet P between multiple sheet discriminators. A horizontal axis of FIG. 23 indicates an actual thickness of the sheet P. A vertical axis of FIG. 23 indicates amounts of variation of the measured values of thickness of the sheet P measured by the multiple sheet discriminators 100 after the thickness of the same sheet P is measured by the multiple sheet discriminators 100.

As illustrated in FIG. 23, by calibrating the measured value of thickness of the sheet P when the thickness of the sheet P is 300 μm or greater, the amounts of variation after calibration of the measured value of thickness of the sheet P between the multiple sheet discriminators 100 become substantially identical to each other in irrespective of the actual thickness of the sheet P, therefore the amounts of variation is reduced effectively. Therefore, in discrimination of the sheet P by the sheet discriminator 100, it is preferable to calibrate the measured value of thickness of the sheet P measured by the sheet discriminator 100 when the thickness of the sheet P is 300 μm or greater.

FIG. 24 is a flowchart showing a calibrating operation of the measured value of thickness of the sheet P measured by the sheet thickness detecting sensor 170 of the sheet discriminator 100.

First, the sheet P is inserted into the sheet discriminator 100 to measure a thickness of the sheet P by the sheet thickness detecting sensor 170 in step S1. The processing device 180 determines whether or not the measured value of thickness of the sheet P measured by the sheet thickness detecting sensor 170 is 300 μm or greater in step S2.

When the measured value of thickness of the sheet P measured by the sheet thickness detecting sensor 170 is less than 300 μm (NO in step S2), the processing device 180 outputs the measured value of thickness of the sheet P measured by the sheet thickness detecting sensor 170 to the controller of the apparatus body 400 in step S3.

By contrast, when the measured value of thickness of the sheet P measured by the sheet thickness detecting sensor 170 is 300 μm or greater (YES in step S2), the processing device 180 calls the calibration value from the memory 181 in step S4.

Thereafter, the processing device 180 performs calibration in which the calibration value is reflected on the measured value of thickness of the sheet P measured by the sheet thickness detecting sensor 170, and then the processing device 180 outputs the calibrated thickness of the sheet P to the controller of the apparatus body 400 as a measurement result, in step S5.

It is to be noted that the thickness of the sheet P can be detected with the configuration of the sheet discriminator 100 illustrated in FIGS. 1 through 12 by incorporating the sheet thickness detecting sensor 170 employed in the configuration of the sheet discriminator 100 illustrated in FIGS. 14 through 21. Even when the combined configuration is employed, it is preferable to perform the above-described calibration to the measured value of thickness of the sheet P.

The above-described configurations are examples. This disclosure can achieve the following aspects effectively.

Aspect A.

A sheet discriminator (for example, the sheet discriminator 100) includes a sheet loader (for example, the sheet loading table 120), an information detector (for example, the sheet information detecting unit 110), a sheet distinguisher (for example, the processing device 180), and a detector body (for example, the external case 101). A recording medium (for example, the sheet P) is loaded on the sheet loader. The information detector includes a light emitter (for example, the light source 110a) to emit light to a surface of the recording medium loaded on the sheet loader and a light receiver (for example, the light receiving elements 110b, 110c, 110d, 110e, and 110f) to receive the light emitted by the light emitter, and detects information of the recording medium. The sheet distinguisher distinguishes a type of the recording medium based on the information detected by the information detector. The detector body encases at least the information detector therein and has an opening (for example, the opening 110k) facing the sheet loader. The opening has at least one arc-shaped side (for example, the long side 110kA).

In Aspect A, when the leading end of the recording medium passes the at least one arc-shaped side of the opening, the leading end of the recording medium is brought into a contact of point and line.

According to this configuration, the leading end of the recording medium is not caught in the at least one arc-shaped side of the opening. Therefore, the recording medium is not curled easily and can be prevented from being damaged.

Aspect B.

In Aspect A, the at least one arc-shaped side of the opening of the detector body is a downstream side edge in a sheet inserting direction in which the recording medium is inserted between the sheet loader and the information detector and a leading end (for example, the leading end Pa) of the recording medium contacts one end (the one end k1) of the at least one arc-shaped side in a direction perpendicular to the sheet inserting direction prior to the other end (for example, the other end k2) of the at least one arc-shaped side.

According to this configuration, as described in the examples above, by reducing the number of contact points where the at least one arc-shaped side of the opening and the leading end of the recording medium contact, it can be further advantageous in preventing the recording medium from being caught at the at least one arc-shaped side of the opening.

Aspect C.

In Aspect A, the at least one arc-shaped side of the opening of the detector body is a downstream side edge in the sheet inserting direction in which the recording medium is inserted between the sheet loader and the information detector and a leading end (for example, the leading end Pa) of the recording medium (for example, the sheet P) contacts an arc portion (for example, the arc part k3) of the at least one arc-shaped side prior to both ends (for example, the one end k1 and the other end k2) of the at least one arc-shaped side.

According to this configuration, as described in the examples above, by reducing the number of contact points of the at least one arc-shaped side of the opening and the leading end of the recording medium. By so doing, it can be further advantageous in preventing the recording medium from being caught at the at least one arc-shaped side of the opening.

Aspect D.

A sheet discriminator (for example, the sheet discriminator 100) includes a sheet loader (for example, the sheet loading table 120), an information detector (for example, the sheet information detecting unit 110), a sheet distinguisher (for example, the processing device 180), and a detector body (for example, the external case 101). A recording medium (for example, the sheet P) is loaded on the sheet loader. The information detector includes a light emitter (for example, the light source 110a) to emit light to a surface of the recording medium loaded on the sheet loader and a light receiver (for example, the light receiving elements 110b, 110c, 110d, 110e, and 110f) to receive the light emitted by the light emitter, and detects information of the recording medium. The sheet distinguisher distinguishes a type of the recording medium based on the information detected by the information detector. The detector body encases at least the information detector therein and has an opening (for example, the opening 110k) formed on an opposing face facing the sheet loader. A length in a sheet conveying direction of an upper part of the opening is smaller than a length in the sheet conveying direction of a lower part of the opening.

According to this configuration, as described in the examples above, by forming the upper part and the lower part of the opening having different lengths, the recording medium is guided smoothly, thereby preventing the leading end of the recording medium from being caught by the opening. Consequently, the recording medium does not have deformation such as curl easily, thereby preventing the recording medium from being damaged.

Aspect E.

In Aspect D, the opening has at least one R-shaped side.

According to this configuration, as described in the examples above, by forming the opening having at least one R-shaped side in the sheet inserting direction, the recording medium is guided smoothly, thereby preventing the leading end of the recording medium from being caught by the opening. Consequently, the recording medium does not have deformation such as curl easily, thereby preventing the recording medium from being damaged.

Aspect F.

In Aspect D, the opening has at least one chamfered side.

According to this configuration, as described in the examples above, by forming the opening having at least one chamfered side in the sheet inserting direction, the recording medium is guided smoothly, thereby preventing the leading end of the recording medium from being caught by the opening. Consequently, the recording medium does not have deformation such as curl easily, thereby preventing the recording medium from being damaged.

Aspect G.

In any one of Aspect A through Aspect F, the sheet discriminator further includes a sheet thickness detector (for example, the sheet thickness detecting sensor 170) and a pressing member (for example, the sheet loading table 120). The sheet thickness detector includes a displacement gauge (for example, the encoder feeler 171) to sandwich the recording medium with an opposing member disposed facing the displacement gauge and to move from an initial position at which the displacement gauge stays when no recording medium is sandwiched with the opposing member and a displacement detector (for example, the optical sensor) to detect an amount of displacement of the displacement gauge, and detects a thickness of the recording medium based on detection results obtained by the displacement detector. The pressing member presses the recording medium to a measurement datum plane (for example, the measurement datum plane 201) mounted on the opposing member when the sheet thickness detector detects the thickness of the recording medium. The displacement detector contacts the measurement datum plane at the initial position. The opposing member has an opposing part facing an end of the recording medium. The opposing part is recessed to be lower than the measurement datum plane when the recording medium is located at an information detecting position to detect information of the recording medium by the information detector.

According to this configuration, as described in the examples above, even if the end of the recording medium is deformed with cut burr and/or curl, the recording medium and the measurement datum plane can contact without a gap. Therefore, the sheet thickness detector can measure the thickness of the recording medium reliably.

Aspect H.

In any one of Aspect A through Aspect G, the light emitter (for example, the light source 110a) emits laser light.

According to this configuration, as described in the examples above, information of the surface of the recording medium can detect clearer, and therefore more accurate detection results can be obtained.

Aspect I.

In any one of Aspect A through Aspect H, the light receiver (for example, the light receiving elements 110b, 110c, 110d, 110e, and 110f) of the information detector (for example, the sheet information detecting unit 110) includes multiple light receivers, and the multiple light receivers include a transmission light receiver (for example, the light receiving element 110f) to receive transmitted light emitted from the light emitter and transmitted through the recording medium.

According to this configuration, as described in the examples above, when the thickness of the recording medium is thin, accuracy in detection of thickness of the recording medium can be enhanced by obtaining the thickness of the recording medium also using a level of received light of the transmission light receiver as the sheet information.

Aspect J.

In any one of Aspect A through Aspect I, the light receiver (for example, the light receiving elements 110b, 110c, 110d, 110e, and 110f) of the information detector (for example, the sheet information detecting unit 110) includes multiple light receivers, and the multiple light receivers include a specular reflection light receiver to receive specular reflection light emitted from the light emitter and reflected on the recording medium and a diffused reflection light receiver to receive diffused reflection light emitted from the light emitter and reflected on the recording medium.

According to this configuration, as described in the examples above, since scattered light beams of diffused reflection light to the recording medium can be detected by multiple sensors disposed at different angles, and therefore more precise detection results of information can be obtained than the information obtained from specular reflection light alone.

Aspect K.

In any one of Aspect A through Aspect J, the sheet discriminator further includes a communicator (for example, the communication cable 60) to communicate the sheet discriminator and an image forming apparatus (for example, the image forming apparatus 2).

According to this configuration, as described in the examples above, information related to the type of the recording medium discriminated by the sheet discriminator is sent from the communicator to the image forming apparatus so as to set the image forming conditions.

Aspect L.

In any one of Aspect A through Aspect F, the sheet discriminator further includes a sheet thickness detector (for example, the sheet thickness detecting sensor 170) including a displacement gauge (for example, the encoder feeler 171) to sandwich the recording medium with an opposing member disposed facing the displacement gauge and to move from an initial position at which the displacement gauge stays when no recording medium is sandwiched with the opposing member and a displacement detector (for the optical sensor 172) to detect an amount of displacement of the displacement gauge and detecting a thickness of the recording medium based on detection results obtained by the displacement detector, and a sheet thickness calibrator (for example, the processing device 180) to calibrate a detected thickness of the recording medium detected by the sheet thickness detector with a reference calibration value.

According to this configuration, as described in the examples above, misdetection of thickness of the recording medium is prevented.

Aspect M.

In any one of Aspect G through Aspect K, the sheet discriminator further includes a sheet thickness calibrator (for example, the processing device 180) to calibrate a detected thickness of the recording medium detected by the sheet thickness detector with a reference calibration value.

According to this configuration, as described in the examples above, misdetection of thickness of the recording medium is prevented.

Aspect N.

In Aspect L or Aspect M, the sheet discriminator further includes a calibration value changer to change the calibration value.

According to this configuration, as described in the examples above, an appropriate calibration value according to the thickness of the sheet can be used. By so doing, an appropriate calibration value according to the thickness of the sheet P can be used.

Aspect O.

In any one of Aspect L through Aspect N, the sheet discriminator further includes a calibration value memory (for example, the memory 181) to store the calibration value.

According to this configuration, as described in the examples above, the thickness of the sheet can be calibrated with the calibration value that is stored in the calibration value memory.

Aspect P.

In any one of Aspect L through Aspect O, the sheet thickness calibrator calibrates the detected thickness of the recording medium when the detected thickness of the recording medium is 300 µm or greater.

According to this configuration, as described in the examples above, a significant difference can be prevented from occurring between the actual sheet thickness and the detected sheet thickness obtained by the sheet thickness detector.

Aspect Q.

In any one of Aspects L through Aspect P, the calibration value is determined based on a difference between the detected thickness detected by the sheet thickness detector and an actual thickness of the recording medium.

According to this configuration, as described in the examples above, an appropriate calibration value according to the thickness of the sheet can be determined.

Aspect R.

An image forming apparatus (for example, the image forming apparatus 2) includes an apparatus body (for example, the apparatus body 400), the sheet discriminator (for example, the sheet discriminator 100) according to any one of Aspect A through Aspect Q disposed outside the apparatus body, and an image forming part (for example, the image forming part 420) to form an image on the recording medium discriminated by the sheet discriminator.

According to this configuration, as described in the examples above, the recording medium is not curled easily and can be prevented from being damaged. At the same time, deterioration in precision of sheet discrimination can be prevented, and therefore image formation can be performed according to the type of the sheet under appropriate image forming conditions.

Aspect S.

In Aspect QR, the image forming apparatus 2 further includes a light emission controller to control activation and stop of the light emitter, and an instruction device (for example, the control panel 200) disposed on the apparatus body and transmitting an instruction to the light emission controller.

According to this configuration, as described in the examples above, an operator inputs instructions via the instruction device to cause the sheet information detector to detect information of the recording medium, so that the light emitter can start light emission. Consequently, when compared with a case in which the light emitter constantly emits light, the life span of the light emitter can be extended and waste energy consumption of the sheet discriminator can be reduced.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of this disclosure may be practiced otherwise than as specifically described herein.

What is claimed is:

1. A sheet discriminator comprising:
  a sheet loader, downstream from a sheet insertion opening, on which a recording medium is loaded;
  an information detector including a light emitter to emit light to a surface of the recording medium loaded on the sheet loader and a light receiver to receive the light emitted by the light emitter and detecting information of the recording medium;
  a sheet distinguisher to distinguish a type of the recording medium based on the information detected by the information detector;
  a detector body encasing at least the information detector therein and having an opening downstream from the sheet insertion opening in the sheet insertion direction and formed on an opposing face facing the sheet loader, the opposing face being parallel to the sheet insertion direction, the opening having at least one arc-shaped side;
  a sheet thickness detector including a displacement gauge to sandwich the recording medium with an opposing member disposed facing the displacement gauge and to move from an initial position at which the displacement gauge stays when no recording medium is sandwiched with the opposing member and a displacement detector to detect an amount of displacement of the displacement gauge and detecting a thickness of the recording medium based on detection results obtained by the displacement detector; and
  a pressing member to press the recording medium to a measurement datum plane mounted on the opposing member when the sheet thickness detector detects the sheet thickness of the recording medium,
  wherein the displacement detector contacts the measurement datum plane at the initial position,
  wherein the opposing member has an opposing part facing an end of the recording medium,
  wherein the opposing part is recessed to be lower than the measurement datum plane when the recording medium is located at an information detecting position to detect information of the recording medium by the information detector.

2. The sheet discriminator according to claim 1, further comprising a sheet thickness calibrator to calibrate a detected thickness of the recording medium detected by the sheet thickness detector with a reference calibration value.

3. The sheet discriminator according to claim 1, wherein the light emitter emits laser light.

4. The sheet discriminator according to claim 1,
  wherein the light receiver of the information detector includes multiple light receivers,
  wherein the multiple light receivers include a transmission light receiver to receive transmitted light emitted from the light emitter and transmitted through the recording medium.

5. The sheet discriminator according to claim 1,
  wherein the light receiver of the information detector includes multiple light receivers,
  wherein the multiple light receivers include a specular reflection light receiver to receive specular reflection light emitted from the light emitter and reflected on the recording medium and a diffused reflection light receiver to receive diffused reflection light emitted from the light emitter and reflected on the recording medium.

6. The sheet discriminator according to claim 1, further comprising a communicator to communicate the sheet discriminator and an image forming apparatus.

7. A sheet discriminator comprising:
  a sheet loader, downstream from a sheet insertion opening, on which a recording medium is loaded;
  an information detector including a light emitter to emit light to a surface of the recording medium loaded on the sheet loader and a light receiver to receive the light emitted by the light emitter and detecting information of the recording medium;
  a sheet distinguisher to distinguish a type of the recording medium based on the information detected by the information detector;
  a detector body encasing at least the information detector therein and having an opening downstream from the sheet insertion opening in the sheet insertion direction and formed on an opposing face facing the sheet loader, the opposing face being parallel to the sheet insertion direction, the opening having at least one arc-shaped side;
  a sheet thickness detector including a displacement gauge to sandwich the recording medium with an opposing member disposed facing the displacement gauge and to move from an initial position at which the displacement gauge stays when no recording medium is sandwiched with the opposing member and a displacement detector to detect an amount of displacement of the displacement gauge and detecting a thickness of the recording medium based on detection results obtained by the displacement detector; and
  a sheet thickness calibrator configured to calibrate a measured thickness of the recording medium detected by the sheet thickness detector with a reference calibration value.

8. The sheet discriminator according to claim 7, further comprising a calibration value changer to change the calibration value.

9. The sheet discriminator according to claim 7, further comprising a calibration value memory to store the calibration value.

10. The sheet discriminator according to claim 7, wherein the sheet thickness calibrator calibrates the detected thickness of the recording medium when the detected thickness of the recording medium is 300 µm or greater.

11. The sheet discriminator according to claim 7, wherein the calibration value is determined based on a difference between the detected thickness detected by the sheet thickness detector and an actual thickness of the recording medium.

12. A sheet discriminator comprising:
   a sheet loader on which a recording medium is loaded;
   an information detector including a light emitter to emit light to a surface of the recording medium loaded on the sheet loader and a light receiver to receive the light emitted by the light emitter and detecting information of the recording medium;
   a sheet distinguisher to distinguish a type of the recording medium based on the information detected by the information detector; and
   a detector body including the information detector therein and having an opening formed on an opposing face facing the sheet loader,
   a length in a sheet conveying direction of an upper part of the opening being smaller than a length in the sheet conveying direction of a lower part of the opening,
   wherein the information detector detects reflection light to the recording medium by multiple sensors disposed at different angles to the recording medium, and
   wherein the information detector receives diffused reflection light to the recording medium by multiple diffused reflection light receiving sensors of the multiple sensors disposed at different angles to the recording medium.

13. The sheet discriminator according to claim 12, wherein the opening has at least one arc-shaped side.

14. The sheet discriminator according to claim 12, wherein the opening has at least one chamfered side.

15. An image forming apparatus comprising:
   an apparatus body;
   the sheet discriminator according to claim 1 disposed outside the apparatus body; and
   an image forming part to form an image on the recording medium discriminated by the sheet discriminator.

16. The image forming apparatus according to claim 15, further comprising
   a light emission controller to control activation and stop of the light emitter; and
   an instruction device disposed on the apparatus body and transmitting an instruction to the light emission controller.

* * * * *